(12) United States Patent
Rock et al.

(10) Patent No.: US 10,130,129 B2
(45) Date of Patent: Nov. 20, 2018

(54) INSULATED COMPOSITE FABRIC

(71) Applicant: MMI-IPCO, LLC, Lawrence, MA (US)

(72) Inventors: Moshe Rock, Brookline, MA (US); James Zeiba, Derry, NH (US); Gadalia Vainer, Melrose, MA (US); Jane Hunter, Manassas, VA (US); Charles Haryslak, Groveland, MA (US); David Costello, Marblehead, MA (US); Shawn Flavin, Sandown, NH (US); Marcus Webster, Pelham, NH (US)

(73) Assignee: MMI-IPCO, LLC, Andover, MA (US)

( * ) Notice: Subject to any disclaimer, the term of this patent is extended or adjusted under 35 U.S.C. 154(b) by 0 days.

(21) Appl. No.: 15/623,717

(22) Filed: Jun. 15, 2017

(65) Prior Publication Data
US 2017/0280799 A1 Oct. 5, 2017

Related U.S. Application Data

(60) Division of application No. 14/639,604, filed on Mar. 5, 2015, which is a continuation of application No.
(Continued)

(51) Int. Cl.
B32B 5/02 (2006.01)
A41D 31/00 (2006.01)
(Continued)

(52) U.S. Cl.
CPC ............ *A41D 31/0038* (2013.01); *B32B 5/02* (2013.01); *B32B 5/024* (2013.01); *B32B 5/26* (2013.01);
(Continued)

(58) Field of Classification Search
CPC ....................................................... B32B 5/02
See application file for complete search history.

(56) References Cited

U.S. PATENT DOCUMENTS

| 436,366 A | 9/1890 | Levy |
| 1,790,832 A | 2/1931 | O'Lena |

(Continued)

FOREIGN PATENT DOCUMENTS

| DE | 295 05 761 | 8/1996 |
| EP | 0 629 727 A1 | 12/1994 |

(Continued)

OTHER PUBLICATIONS

International Search Report & Written Opinion; PCT/US2010/043367; Jose Mendo Perez; dated Mar. 7, 2011.
(Continued)

*Primary Examiner* — Andrew T Piziali
(74) *Attorney, Agent, or Firm* — Fish & Richardson P.C.

(57) ABSTRACT

An insulated composite fabric has an inner fabric layer, an outer fabric layer, and an insulating-filler layer enclosed there between. The insulating-filler layer is a textile fabric with at least one raised surface. One side of the insulating-filler layer comprises a first surface with relatively high pile, including regions of no pile or relatively low pile interspersed among regions of relatively high pile. The other side of the insulating-filler layer comprises a second surface with relatively high pile, including regions of no pile or relatively low pile interspersed among regions of relatively high pile. Interconnecting piles are formed with regions of the relatively high pile of the first pile surface and regions of the relatively high pile of the second pile surface.

8 Claims, 17 Drawing Sheets

Related U.S. Application Data

13/786,654, filed on Mar. 6, 2013, now abandoned, which is a continuation-in-part of application No. 12/817,756, filed on Jun. 17, 2010.

(60) Provisional application No. 61/334,248, filed on May 13, 2010, provisional application No. 61/263,960, filed on Nov. 24, 2009.

(51) Int. Cl.
*D06C 27/00* (2006.01)
*B32B 5/26* (2006.01)
*B32B 37/18* (2006.01)
*D05B 1/02* (2006.01)
*D05B 11/00* (2006.01)
*D05C 15/04* (2006.01)

(52) U.S. Cl.
CPC .............. *B32B 37/18* (2013.01); *D05B 1/02* (2013.01); *D05B 11/00* (2013.01); *D05C 15/04* (2013.01); *D06C 27/00* (2013.01); *B32B 2250/04* (2013.01); *B32B 2250/20* (2013.01); *B32B 2305/18* (2013.01); *B32B 2307/304* (2013.01); *B32B 2437/00* (2013.01); *Y10T 156/10* (2015.01); *Y10T 428/239* (2015.01); *Y10T 428/23914* (2015.04)

(56) References Cited

U.S. PATENT DOCUMENTS

| | | |
|---|---|---|
| 2,429,434 A | 10/1947 | Underwood et al. |
| 2,815,558 A | 12/1957 | Albert et al. |
| 2,884,680 A | 5/1959 | Nowicki |
| 2,990,549 A | 7/1961 | Doughty |
| 3,030,691 A | 4/1962 | Law |
| 3,067,430 A | 12/1962 | Wilcox |
| 3,528,874 A | 9/1970 | Spencer |
| 3,607,591 A | 9/1971 | Hansen |
| 3,850,783 A | 11/1974 | Peters et al. |
| 3,856,598 A | 12/1974 | Gregorian et al. |
| 3,906,128 A | 9/1975 | Burling et al. |
| 3,916,956 A | 11/1975 | Harris et al. |
| 4,018,956 A | 4/1977 | Casey |
| 4,057,083 A | 11/1977 | Juillard et al. |
| 4,103,055 A | 7/1978 | Levy |
| 4,112,560 A | 9/1978 | Willbanks |
| 4,381,788 A | 5/1983 | Douglas |
| 4,418,451 A | 12/1983 | Crenshaw |
| 4,578,042 A | 3/1986 | Evert |
| 4,756,958 A | 7/1988 | Bryant et al. |
| 4,851,291 A | 7/1989 | Vigo et al. |
| 4,871,615 A | 10/1989 | Vigo et al. |
| 4,937,136 A | 6/1990 | Coombs |
| 5,115,516 A | 5/1992 | Golde |
| 5,126,182 A | 6/1992 | Lumb et al. |
| 5,146,634 A | 9/1992 | Hunt |
| 5,204,156 A | 4/1993 | Lumb et al. |
| 5,268,212 A | 12/1993 | Lumb et al. |
| 5,302,806 A | 4/1994 | Simmons et al. |
| 5,312,667 A | 5/1994 | Lumb et al. |
| 5,364,678 A | 11/1994 | Lumb et al. |
| 5,366,801 A | 11/1994 | Bryant et al. |
| 5,388,271 A | 2/1995 | Sessoms |
| 5,408,700 A | 4/1995 | Reuben et al. |
| 5,413,837 A | 5/1995 | Rock et al. |
| 5,469,581 A | 11/1995 | Uthoff |
| 5,589,245 A | 12/1996 | Roell |
| 5,622,762 A | 4/1997 | Perla |
| 5,624,738 A | 4/1997 | Barbeau et al. |
| 5,691,040 A | 11/1997 | Barbeau et al. |
| 5,692,245 A | 12/1997 | Reuben |
| 5,799,600 A | 9/1998 | Reuben |
| 5,855,125 A | 1/1999 | Lohmueller et al. |
| 5,885,475 A | 3/1999 | Salyer |
| 5,906,877 A | 5/1999 | Popper et al. |
| 5,951,798 A | 9/1999 | Schmidt et al. |
| 6,004,662 A | 12/1999 | Buckley |
| 6,035,749 A | 3/2000 | Haselwander |
| 6,041,437 A | 3/2000 | Barker et al. |
| 6,076,242 A | 6/2000 | Kasoka et al. |
| 6,125,645 A | 10/2000 | Horn |
| 6,131,419 A | 10/2000 | Rock et al. |
| 6,179,879 B1 | 1/2001 | Robinson et al. |
| 6,194,322 B1 | 2/2001 | Lilleland et al. |
| 6,194,332 B1 | 2/2001 | Rock et al. |
| 6,196,032 B1 | 3/2001 | Rock et al. |
| 6,199,410 B1 | 3/2001 | Rock et al. |
| 6,263,511 B1 | 7/2001 | Moretti |
| 6,312,784 B2 | 11/2001 | Russell et al. |
| 6,332,221 B1 | 12/2001 | Gracey |
| 6,381,482 B1 | 4/2002 | Jayaraman et al. |
| 6,602,811 B1 | 8/2003 | Rock et al. |
| 6,674,535 B1 | 1/2004 | Kim |
| 6,689,466 B2 | 2/2004 | Hartmann |
| 6,716,778 B1 | 4/2004 | Hottner |
| 6,779,368 B2 | 8/2004 | Rock et al. |
| 6,793,856 B2 | 9/2004 | Hartmann et al. |
| 6,832,497 B1 | 12/2004 | Rock et al. |
| 6,837,078 B1 | 1/2005 | Rock et al. |
| 6,855,410 B2 | 2/2005 | Buckley |
| 6,855,422 B2 | 2/2005 | Magill et al. |
| 6,881,219 B1 | 4/2005 | Agarwal et al. |
| 6,923,219 B2 | 8/2005 | Shteiyer |
| 7,027,699 B2 | 4/2006 | Tao et al. |
| 7,217,456 B1 | 5/2007 | Rock et al. |
| 7,284,398 B2 | 10/2007 | Hubner |
| 7,428,772 B2 | 9/2008 | Rock |
| 7,497,097 B2 | 3/2009 | Herr |
| 7,624,456 B2 | 12/2009 | Williams et al. |
| 2001/0019050 A1 | 9/2001 | Rock et al. |
| 2002/0122914 A1 | 9/2002 | Rock et al. |
| 2003/0003264 A1 | 1/2003 | Rock et al. |
| 2004/0045143 A1 | 3/2004 | Rock et al. |
| 2004/0132367 A1 | 7/2004 | Rock |
| 2004/0170799 A1 | 9/2004 | Carr et al. |
| 2005/0003139 A1 | 1/2005 | Keller |
| 2005/0075028 A1 | 4/2005 | Rock et al. |
| 2005/0095940 A1 | 5/2005 | Rock et al. |
| 2005/0121041 A1 | 6/2005 | Barnitz |
| 2005/0204448 A1 | 9/2005 | Wise et al. |
| 2006/0234571 A1 | 10/2006 | Rock |
| 2006/0234573 A1 | 10/2006 | Rock |
| 2006/0277950 A1 | 12/2006 | Rock |
| 2007/0218792 A1 | 9/2007 | Walters |
| 2007/0234463 A1 | 10/2007 | Rock et al. |
| 2008/0096011 A1 | 4/2008 | Allemand |
| 2008/0108265 A1 | 5/2008 | Pourdeyhimi |
| 2009/0186548 A1 | 7/2009 | Rock et al. |
| 2009/0260126 A1 | 10/2009 | Rock et al. |
| 2010/0159241 A1 | 6/2010 | Liu et al. |
| 2012/0070608 A1 | 3/2012 | Rock et al. |
| 2012/0260422 A1 | 10/2012 | Rock et al. |
| 2014/0115783 A1 | 5/2014 | Rock et al. |

FOREIGN PATENT DOCUMENTS

| | | |
|---|---|---|
| EP | 1 306 475 | 5/2003 |
| EP | 1 338 691 A1 | 8/2003 |
| FR | 2 549 503 | 1/1985 |
| FR | 2 867 667 | 9/2005 |
| JP | S40-028784 | 10/1965 |
| JP | 3148535 | 2/2009 |
| WO | WO 2001/73178 | 10/2003 |
| WO | WO 2006/002371 | 1/2006 |
| WO | WO 2008/091684 | 7/2008 |
| WO | WO 2011/066000 | 6/2011 |

OTHER PUBLICATIONS

International Search Report and Written Opinion; PCT/US2012/054371; I. Carl; dated Feb. 25, 2013; 19 pp.

(56) References Cited

OTHER PUBLICATIONS

Notice of Reasons for Rejection; JP 2012-539884; dated May, 20, 2014; 10 pp with English translation.
Office Action in corresponding Chinese Application No. 201280074036.3, dated Jun. 30, 2015, pp. 1-12.
European Examination Report; EP 10 757 868.4; dated Jan. 21, 2016; 4 pp.
European Search Report; EP 16 19 7225; dated Mar. 10, 2017; 5 pages.
International Search Report and Written Opinion, International Application No. PCT/US05/22479, dated Oct. 2, 2006, 7 pages.
Supplementary European Search Report, European Application No. EP 05 76 3638, dated Apr. 1, 2008, 3 pages.
European Search Report; EP 16 197 225.2-1731; dated Jun. 30, 2017; 10 pages.
Office Action in counterpart Korean Application 10-2017-7023752, dated Nov. 20, 2017.

INSULATED COMPOSITE FABRIC

CROSS-REFERENCE TO RELATED APPLICATIONS

This application is a divisional of U.S. patent Ser. No. 14/639,604, filed on Mar. 5, 2015, which is a continuation of U.S. patent application Ser. No. 13/786,654, filed on Mar. 6, 2013 (now pending), which is a continuation-in-part of U.S. patent application Ser. No. 12/817,756, on filed Jun. 17, 2010 (now pending), which claims priority from U.S. Provisional Application No. 61/263,960, filed on Nov. 24, 2009, and U.S. Provisional Application No. 61/334,248, filed on May 13, 2010, the contents of all of which are incorporated herein by reference in their entirety.

TECHNICAL FIELD

This disclosure relates to insulated composite fabrics that incorporate a textile fabric with raised surface on one side or both sides as an insulating filler material.

BACKGROUND

Conventional down fabric constructions often include nonwoven filler material enclosed between two woven fabric "shell" layers. These nonwoven filler materials are known to provide a relatively high level of thermal insulation, and are lightweight with very good packability.

Some known nonwoven filler materials, such as Primaloft®, available from Albany International Corp, and Thinsulate™, available from 3M Company, are prone to movement and fibers of the nonwoven filler material often have a tendency to protrude through the woven fabric layers. To inhibit this fiber migration, it is known to quilt the filler material to one or both of the woven fabric layers. The quilting, however, tends to flatten the nonwoven filler material, and, as a result, can reduce the thermal insulation of the fabric construction. The quilting may also inhibit the fabric construction from stretching.

To inhibit migrating fibers from protruding through the woven fabric layers, the woven fabric layers are often made of a very tight construction with an air permeability of less than 1.0 ft$^3$/ft$^2$/min and, in many cases, close to zero ft$^3$/ft$^2$/min. In some cases, the woven fabric is calendared, being passed through heated rolls under high pressure, to seal voids in the tight woven construction. In certain circumstances, a chemical system is applied to the woven fabric prior to calendaring to help seal voids in the woven fabric. This type of sealing may reduce the air permeability of the fabric construction to almost zero ft$^3$/ft$^2$/min. As a result, a garment made from the resulting fabric constructions may have reasonable insulation, but poor air permeability and, as a result, low breathability.

Nonwoven filler materials also tend to flatten under compression and as a result may exhibit a loss in thermal insulation.

SUMMARY

In general, this disclosure relates to insulated composite fabrics that incorporate a textile fabric with raised surface on one side or both sides as an insulating filler material.

One aspect of the disclosure, described below with reference, e.g., to FIG. 12 and FIGS. 13A-13E of the drawings, is directed to an insulated composite fabric comprising: an inner fabric layer, an outer fabric layer, and an insulating-filler layer enclosed between the inner fabric layer and the outer fabric layer, wherein the insulating-filler layer is a textile fabric with at least one raised surface on the fabric, one side of the insulating-filler layer comprising a first surface with relatively high pile and including regions of no pile or relatively low pile interspersed among regions of the relatively high pile, the other side of the insulating-filler layer comprising a second surface with relatively high pile and including regions of no pile or relatively low pile interspersed among the regions of relatively high pile, and interconnecting piles formed with regions of the relatively high pile of the first pile surface and regions of the relatively high pile of the second pile surface.

Implementations of this aspect of the disclosure may include one or more of the following additional features. One or more of the regions of relatively low pile comprises regions of fleece or velour. The insulating-filler fabric layer comprises a terry sinker loop fabric with the terry loop left un-napped. The terry sinker loop fabric has a reverse plaited construction. The insulating-filler fabric layer has a weight of about 1 ounce per square yard to about 12 ounces per square yard, and a thickness (bulk) of about 0.1 inch to about 4 inches; and wherein the insulating-filler fabric layer provides insulation of 0.2 clo/oz$^2$ to 1.6 clo/oz$^2$. The insulating-filler fabric layer is quilted to one or both of the inner fabric layer and the outer fabric layer. The insulating-filler fabric layer is stitched to one or both of the inner fabric layer and the outer fabric layer along a periphery of the insulated composite fabric. The inner fabric layer has an air permeability that is different from an air permeability of the outer fabric layer, and wherein the inner fabric layer has an air permeability that is relatively greater than an air permeability of the outer fabric layer, or wherein the inner fabric layer has an air permeability that is relatively less than an air permeability of the outer fabric layer. The insulated composite fabric has an air permeability of about 1.0 ft$^3$/ft$^2$/min to about 300 ft$^3$/ft$^2$/min, tested according to ASTM D-737 under a pressure difference of ½ inch of water across the insulated composite fabric, and wherein the insulated composite fabric provides insulation of 0.2 clo/oz$^2$ to 3.0 clo/oz$^2$. The insulated composite fabric further comprises a waterproof membrane laminated to an inner surface of the outer fabric layer, and disposed between the outer fabric layer and the insulating-filler fabric layer, and wherein the waterproof membrane is a vapor permeable membrane, or wherein the waterproof membrane is selected from a porous hydrophobic membrane, a hydrophilic non-porous membrane, and an electrospun membrane. The insulating-filler fabric layer has a terry sinker loop surface including a plurality of discrete regions of no terry sinker loop interspersed among regions of terry sinker loop. The insulating-filler fabric layer has a pile surface including a plurality of first discrete regions having a first pile height interspersed among a plurality of other discrete regions having contrasting pile height relatively greater than the first pile height. Yarns forming the first discrete regions are relatively finer than yarns forming the other discrete regions, and wherein yarns forming the first discrete regions have a denier per filament (dpf) of less than 1.0. The insulating-filler fabric layer is constructed to include face yarn that is positioned perpendicular to stitching yarn or backing yarn.

Another aspect of the disclosure is directed to a method comprising forming an insulated composite fabric including: enclosing an insulating-filler fabric layer between an inner fabric layer and an outer fabric layer, wherein the insulating-filler fabric layer is a textile fabric with at least one raised surface on the fabric; one side of the insulating filler fabric layer comprising a first relatively high pile surface, the other side of the insulating filler fabric layer comprising a second relatively high pile surface, the first relatively high pile surface and the second relatively high pile surface including regions of no pile interspersed between the regions of relatively high pile; and forming an insulated composite fabric including fleece/velour in regions of relatively low pile lower than the relatively high pile of the first relatively high pile surface and lower than the relatively high pile of the second relatively high pile surface on at least one region of no pile on the first and second pile surfaces.

Implementations of this aspect of the disclosure may include one or more of the following additional features. Enclosing the insulating-filler fabric layer comprises sewing the insulating-filler fabric layer to one or both of the inner fabric layer and the outer fabric layer. Enclosing the insulating-filler fabric layer comprises laminating the insulating-filler fabric layer to one or both of the inner fabric layer and the outer fabric layer. Enclosing the insulating-filler fabric layer comprises quilting the insulating-filler fabric layer to one or both of the inner fabric layer and the outer fabric layer. Enclosing the insulating-filler fabric layer comprises stitching the insulating-filler fabric layer to one or both of the inner fabric layer and the outer fabric layer along a periphery of the insulated composite fabric. Forming the insulating-filler fabric layer comprises including face yarn positioned perpendicular to stitching yarn or backing yarn.

Another aspect of the disclosure provides an insulated composite fabric that includes an inner fabric layer, an outer fabric layer, and an insulating-filler fabric layer enclosed between the inner fabric layer and the outer fabric layer. The insulating-filler fabric layer is a textile fabric with a raised surface on at least one side of the fabric.

Implementations of this aspect of the disclosure may include one or more of the following additional features. The insulating-filler fabric layer includes a double face warp knit fabric. The double face warp knit fabric has a technical back having a plush velvet surface, and a technical face having a velour surface. The insulating-filler fabric layer includes a double face knit fabric having reverse plaited terry sinker loop knit construction. The double face knit fabric has a technical face with a raised or napped surface, and a technical back with a cut loop or velour surface. The insulating-filler fabric layer includes a knit fabric having sliver knit construction. The insulating-filler fabric layer includes a terry sinker loop fabric in which the terry loop is left un-raised. The terry sinker loop fabric has a reverse plaited construction. A technical face of the terry sinker loop fabric has a napped finish and a technical back is left as un-napped, terry loop. A technical face of the terry sinker loop fabric is left un-napped and a technical back is left as un-napped, terry loop. The terry sinker loop fabric has a regular plaited construction. The insulating-filler fabric layer has a terry sinker loop surface including a plurality of discrete regions of no terry sinker loop interspersed among regions of terry sinker loop. The insulating-filler fabric layer includes a double face knit fabric having sliver knit construction. The insulating fabric layer has a weight of about 1 ounce per square yard to about 12 ounces per square yard (e.g., about 1 ounce per square yard to about 4 ounces per square yard, about 3 ounces per square yard to about 8 ounces per square yard, or about 4 ounces per square yard to about 12 ounces per square yard). The insulating-filler fabric layer is quilted to one or both of the inner fabric layer and the outer fabric layer. The insulating-filler fabric layer is stitched to one or both of the inner fabric layer and the outer fabric layer along a periphery of the insulated composite fabric. The insulating-filler fabric layer is laminated to one or both of the inner fabric layer and the outer fabric layer. The insulating-filler fabric layer has a thickness (bulk) of about 0.1 inch to about 4.0 inches (e.g., about 0.1 inch to about 0.2 inch, about 0.15 inch to about 0.4 inch, about 0.2 inch to about 1.0 inch, or about 3 inches to about 4 inches). The insulating-filler fabric layer has a pile surface including a plurality of discrete regions of no pile interspersed among regions of pile. The insulating-filler fabric layer has a pile surface that includes a plurality of first discrete regions having a first pile height interspersed among a plurality of other discrete regions having contrasting pile height relatively greater than the first pile height. In some cases, yarns forming the first discrete regions are relatively finer that yarns forming the other discrete regions. In some examples, yarns forming the first discrete regions have a denier per filament (dpf) of less than 1.0. The insulating-filler fabric layer provides insulation of about 0.2 clo/oz$^2$ to about 1.6 clo/oz$^2$. The insulating-filler fabric layer includes a hydrophobic fabric. The inner fabric layer includes a woven fabric. The inner fabric layer includes a knit fabric having a single jersey construction, a double knit construction, a warp knit construction, or a mesh construction. The inner fabric layer may have an air permeability that is different from an air permeability of the outer fabric layer. The inner fabric layer has an air permeability that is relatively greater than an air permeability of the outer fabric layer. The inner fabric layer has an air permeability that is relatively less than an air permeability of the outer fabric layer. In some cases, the inner fabric layer has an air permeability that is the same as the air permeability of the outer fabric layer. The inner fabric layer has an air permeability of about 5 ft$^3$/ft$^2$/min to about 300 ft$^3$/ft$^2$/min, tested according to ASTM D-737 under a pressure difference of ½ inch of water across the inner fabric layer. The outer fabric layer has an air permeability of about 1 ft$^3$/ft$^2$/min to about 100 ft$^3$/ft$^2$/min, (e.g., about 1 ft$^3$/ft$^2$/min to about 100 ft$^3$/ft$^2$/min), tested according to ASTM D-737 under a pressure difference of ½ inch of water across the outer fabric layer. In some cases, both the inner fabric layer and the outer fabric layer have very high air permeability (e.g., at least 200 ft$^3$/ft$^2$/min, tested according to ASTM D-737 under a pressure difference of ½ inch of water across the respective fabric layer). The outer fabric layer includes a woven fabric. The insulated composite fabric has stretch in at least one direction. At least one of the outer fabric layer, the inner fabric layer, and the insulating-filler fabric layer includes fibers of stretch and/or elastomeric material. The stretch material includes elastomeric yarns and/or fibers (e.g., spandex yarns and/or fibers). The outer fabric layer is treated with durable water repellent, an abrasion resistant coating, camouflage, or infrared radiation reduction. The insulated composite fabric has an air permeability of about 1.0 ft$^3$/ft$^2$/min to about 300 ft$^3$/ft$^2$/min, tested according to ASTM D-737 under a pressure difference of ½ inch of water across the insulated composite fabric (e.g., about 100 ft$^3$/ft$^2$/min to about 300 ft$^3$/ft$^2$/min, tested according to ASTM D-737 under a pressure difference of ½ inch of water across the insulated composite fabric, or about 1.0 ft$^3$/ft$^2$/min to about 80.0 ft$^3$/ft$^2$/min, tested according to ASTM D-737 under a pressure difference of ½ inch of water across the insulated composite fabric). The insulating-filler fabric layer is constructed to include face yarn that is positioned generally perpendicular to stitching or backing yarn. The insulated composite fabric provides insulation of about 0.2 clo/oz$^2$ to about 3.0 clo/oz$^2$ (e.g., about 0.8 clo/oz$^2$ to about 1.6 clo/oz$^2$, about 1.0 clo/oz$^2$ to about 1.8 clo/oz$^2$, or about 1.0 clo/oz$^2$ to about 3.0 clo/oz$^2$). At least one of the inner fabric layer, the outer fabric layer, and the insulating-filler fabric layer includes flame-retardant material or is treated to provide flame-retardance. The insulated composite fabric may also include a waterproof membrane that is laminated to an inner surface of the outer fabric layer, and which is disposed between the outer fabric layer and the insulating-filler fabric layer. The waterproof membrane may be a vapor permeable membrane. The waterproof membrane may be a porous hydrophobic membrane, a hydrophilic non-porous membrane, or an electrospun material.

Another aspect of the disclosure features a fabric garment that includes a first fabric portion formed of a first insulated composite fabric. The first insulated composite fabric includes a first inner fabric layer, a first outer fabric layer, and a first insulating-filler fabric layer enclosed between the first inner fabric layer and the first outer fabric layer. The first insulating-filler fabric layer is a textile fabric with a raised surface on at least one side of the fabric.

Implementations of this aspect of the disclosure may include one or more of the following additional features. The first insulating-filler fabric layer includes a double face warp knit fabric. The double face warp knit fabric has a technical back having plush velvet surface, and a technical face having a velour surface. The first insulating-filler fabric layer includes a double face knit fabric having reverse plaited terry sinker loop knit construction. The double face knit fabric has a technical face with a raised or napped surface, and a technical back with a cut loop or velour surface. The first insulating-filler fabric layer includes a knit fabric having sliver knit construction. The first insulating-filler fabric layer includes a double face knit fabric having sliver knit construction. The first insulating-filler fabric layer includes a terry sinker loop fabric in which the terry loop is left un-raised. The terry sinker loop fabric has a reverse plaited construction. A technical face of the terry sinker loop fabric has a napped finish and a technical back is left as un-napped, terry loop. In some cases, a technical face of the terry sinker loop fabric is left un-napped and a technical back is left as un-napped, terry loop. The terry sinker loop fabric has a regular plaited construction. The first insulating-filler fabric layer has a terry sinker loop surface including a plurality of discrete regions of no terry sinker loop interspersed among regions of terry sinker loop. The first insulating-filler fabric layer has a weight of about 1 ounce per square yard to about 12 ounces per square yard (e.g., about 1 ounce per square yard to about 4 ounces per square yard, about 3 ounces per square yard to about 8 ounces per square yard, or about 4 ounces per square yard to about 12 ounces per square yard). The first insulating-filler fabric layer is quilted to one or both of the first inner fabric layer and the first outer fabric layer. The first insulating-filler fabric layer is anchored at seams connecting the first inner fabric layer and the first outer fabric layer. The first insulating-filler fabric layer is laminated to one or both of the first inner fabric layer and the first outer fabric layer. The first insulating-filler fabric layer has a pile surface including a plurality of discrete regions of no pile interspersed among regions of pile. In some cases, the first insulating-filler fabric layer has a pile surface that includes a plurality of first discrete regions having a first pile height interspersed among a plurality of other discrete regions having contrasting pile height relatively greater than the first pile height. In some examples, yarns forming the first discrete regions are relatively finer that yarns forming the other discrete regions. In some cases, yarns forming the first discrete regions have a denier per filament (dpf) of less than 1.0. The first insulating-filler fabric layer provides insulation of about 0.2 clo/oz$^2$ to about 1.6 clo/oz$^2$. The first insulating-filler fabric layer includes a hydrophobic fabric. The first inner fabric layer includes a woven fabric. The first inner fabric layer includes a knit fabric having a single jersey construction, a double knit construction, a warp knit construction, or a mesh construction. The first inner fabric layer may have an air permeability that is different from an air permeability of the first outer fabric layer. The first inner fabric layer has an air permeability that is relatively greater than an air permeability of the first outer fabric layer. The first inner fabric layer has an air permeability that is relatively less than an air permeability of the first outer fabric layer. In some cases, the first inner fabric layer has an air permeability that is the same as the air permeability of the first outer fabric layer. The first inner fabric layer has an air permeability of about 5 ft$^3$/ft$^2$/min to about 300 ft$^3$/ft$^2$/min, tested according to ASTM D-737 under a pressure difference of ½ inch of water across the inner fabric layer. The first outer fabric layer has an air permeability of about 1 ft$^3$/ft$^2$/min to about 100 ft$^3$/ft$^2$/min, (e.g., about 1 ft$^3$/ft$^2$/min to about 100 ft$^3$/ft$^2$/min) tested according to ASTM D-737 under a pressure difference of ½ inch of water across the first outer fabric layer. The first outer fabric layer includes a woven fabric. The first insulated composite fabric has stretch in at least one direction. At least one of the first outer fabric layer, the first inner fabric layer, and the first insulating-filler fabric layer includes fibers of stretch and/or elastomeric material (e.g., elastomeric yarns and/or fibers, e.g., spandex yarns and/or fibers). The first outer fabric layer is treated with durable water repellent, an abrasion resistant coating, camouflage, or infrared radiation reduction. The first insulated composite fabric has an air permeability of about 1.0 ft$^3$/ft$^2$/min to about 80.0 ft$^3$/ft$^2$/min, tested according to ASTM D-737 under a pressure difference of ½ inch of water across the first insulated composite fabric (e.g., about 4.0 ft$^3$/ft$^2$/min to about 20.0 ft$^3$/ft$^2$/min, tested according to ASTM D-737 under a pressure difference of ½ inch of water across the first insulated composite fabric). The fabric garment also includes a second fabric portion, and the first and second fabric portions have one or more contrasting properties selected from contrasting stretch, contrasting water resistance, contrasting insulative properties, and contrasting air permeability. The second fabric portion is formed of a second insulated composite fabric. The second insulated composite fabric includes a second inner fabric layer, a second outer fabric layer, and a second insulating-filler fabric layer enclosed between the second inner fabric layer and the second outer fabric layer. The second insulated composite fabric has an air permeability that is different from, and greater than, an air permeability of the first insulated composite fabric. The second insulating-filler fabric layer is a textile fabric with a raised surface on at least one side of the fabric. The second insulating-filler fabric layer includes a double face warp knit fabric. The double face warp knit fabric has a technical back having plush velvet surface, and a technical face having a velour surface. The second insulating-filler fabric layer includes a double face knit fabric having reverse plaited terry sinker loop knit construction. The double face knit fabric has a technical face with a raised or napped surface, and a technical back with a cut loop or velour surface. The second insulating-filler fabric layer includes a knit fabric having sliver knit construction. The second insulating-filler fabric layer includes a double face knit fabric having sliver knit construction. The second insulating-filler fabric layer includes a terry sinker loop fabric in which the terry loop is left un-raised. The terry sinker loop fabric has a reverse plaited construction. A technical face of the terry sinker loop fabric has a napped finish and a technical back is left as un-napped, terry loop. A technical face of the terry sinker loop fabric is left un-napped and a technical back is left as un-napped, terry loop. The terry sinker loop fabric has a regular plaited construction. The second insulating-filler fabric layer has a terry sinker loop surface including a plurality of discrete regions of no terry sinker loop interspersed among regions of terry sinker loop. The second insulating fabric layer has a weight of about 1 ounce per square yard to about 12 ounces per square yard (e.g., about 1 ounce per square yard to about 4 ounces per square yard, about 3 ounces per square yard to about 8 ounces per square yard, or about 4 ounces per square yard to about 12 ounces per square yard). The second insulating-filler fabric layer is quilted to one or both of the second inner fabric layer and the second outer fabric layer. The second insulating-filler fabric layer is anchored at seams connecting the second inner fabric layer and the second outer fabric layer. The second insulating-filler fabric layer is laminated to one or both of the second inner fabric layer and the second outer fabric layer. The second insulating-filler fabric layer has a pile surface including a plurality of discrete regions of no pile interspersed among regions of pile. In some cases, the second insulating-filler fabric layer has a pile surface that includes a plurality of first discrete regions having a first pile height interspersed among a plurality of other discrete regions having contrasting pile height relatively greater than the first pile height. In some examples, yarns forming the first discrete regions are relatively finer that yarns forming the other discrete regions. In some cases, yarns forming the first discrete regions have a denier per filament (dpf) of less than 1.0. The second insulating-filler fabric layer provides insulation of about 0.2 clo/oz$^2$ to about 1.6 clo/oz$^2$. The second insulating-filler fabric layer comprises a hydrophobic fabric. The second inner fabric layer includes a woven fabric. The second inner fabric layer includes a knit fabric having a single jersey construction, a double knit construction, a warp knit construction, or a mesh construction. The second outer fabric layer includes a woven fabric. The second insulated composite fabric has stretch in at least one direction. At least one of the second outer fabric layer, the second inner fabric layer, and the second insulating-filler fabric layer includes fibers of stretch and/or elastomeric material. The elastomeric material includes elastomeric yarns and/or fibers (e.g., spandex yarns and/or fibers). The second outer fabric layer is treated with durable water repellent, an abrasion resistant coating, camouflage, or infrared radiation reduction. The second insulated composite fabric has an air permeability of about 5 ft$^3$/ft$^2$/min to about 300 ft$^3$/ft$^2$/min, tested according to ASTM D-737, under a pressure difference of ½ inch of water across the second insulated composite fabric. The second fabric portion is formed of a knit fabric having a single jersey construction, a double knit construction, or a rib knit construction. The second fabric portion is formed of a single layer fabric or a laminate composite fabric. The single layer fabric has a single jersey construction, a double knit construction, a rib knit construction, or a woven construction. The second fabric portion includes a woven fabric. The second fabric portion has an air permeability that is different from an air permeability of the first fabric portion. The second fabric portion has an air permeability that is relatively greater than an air permeability of the first fabric portion. The second fabric portion has an air permeability that is relatively less than an air permeability of the first fabric portion. The second fabric portion has an air permeability of about 5 ft$^3$/ft$^2$/min to about 300 ft$^3$/ft$^2$/min, tested according to ASTM D-737, under a pressure difference of ½ inch of water across fabric forming the second fabric portion. The second fabric portion has greater stretch than the first fabric portion in at least one direction. At least one of the first inner fabric layer, the first outer fabric layer, the first insulating-filler fabric layer, the second inner fabric layer, the second outer fabric layer, and the second insulating-filler fabric layer includes flame-retardant material or is treated to provide flame-retardance. The fabric garment may also include a waterproof membrane that is laminated to an inner surface of the first outer fabric layer, and which is disposed between the first outer fabric layer and the first insulating-filler fabric layer. The waterproof membrane is a vapor permeable membrane. The waterproof membrane is a porous hydrophobic membrane, a hydrophilic non-porous membrane, or an electrospun material. The fabric garment is reversible, and the first inner fabric layer and the first outer fabric layer have contrasting appearance and/or surface texture.

Another aspect of the disclosure provides a method that includes forming an insulated composite fabric by enclosing an insulating-filler fabric layer between an inner fabric layer and an outer fabric layer. The insulating-filler fabric layer is a textile fabric with a raised surface on at least one side of the fabric.

Implementations of this aspect of the disclosure may include one or more of the following additional features. Enclosing the insulating-filler fabric layer includes sewing the insulating-filler fabric layer to one or both of the inner fabric layer and the outer fabric layer. Enclosing the insulating-filler fabric layer includes laminating the insulating-filler fabric layer to one or both of the inner fabric layer and the outer fabric layer. The method also includes treating the outer fabric layer with durable water repellent (DWR), an abrasion resistant coating, camouflage, and/or infrared radiation reduction. The method also includes forming one or more fabric elements out of the insulated composite fabric, and incorporating the fabric elements into a fabric garment. The method also includes forming one or more other fabric elements out of another fabric, and incorporating the one or more other fabric elements into the fabric garment. The other fabric has an air permeability that is different from an air permeability of the insulated composite fabric. The other fabric has an air permeability that is relatively greater than an air permeability of the insulated composite fabric. In some cases, the other fabric has an air permeability that is relatively less than an air permeability of the insulated composite fabric. The other fabric has greater stretch than the insulated composite fabric in at least one direction. The other fabric is a single layer fabric or a laminate fabric.

Another aspect of the disclosure features a method of forming a hybrid composite fabric garment. The method includes forming a first fabric portion out of a first insulated composite fabric and forming a second fabric portion out of another fabric having an air permeability that is different from, and greater than, an air permeability of the first insulated composite fabric. The method also includes joining together the first and second fabric portions to form the hybrid composite fabric garment. The first insulated composite fabric includes a first inner fabric layer, a first outer fabric layer, and a first insulating-filler fabric layer enclosed between the first inner fabric layer and the first outer fabric layer. The first insulating-filler fabric layer is a textile fabric with a raised surface on at least one side of the fabric;

Implementations of this aspect of the disclosure may include one or more of the following additional features. The other fabric is a second insulated composite fabric. The second insulated composite fabric includes a second inner fabric layer, a second outer fabric layer, and a second insulating-filler fabric layer enclosed between the second inner fabric layer and the second outer fabric layer. The second insulating-filler fabric layer is a textile fabric with a raised surface on at least one side of the fabric. The second insulated composite fabric has an air permeability that is different from, and greater than, an air permeability of the first insulated composite fabric. The method also includes forming the second insulated composite fabric by enclosing the second insulating-filler fabric layer between the second inner fabric layer and the second outer fabric layer. Enclosing the second insulating-filler fabric layer includes quilting the second insulating-filler fabric layer to one or both of the second inner fabric layer and the second outer fabric layer. Enclosing the second insulating-filler fabric layer includes laminating the second insulating-filler fabric layer to one or both of the second inner fabric layer and the second outer fabric layer. The method also includes forming the first insulated composite fabric by enclosing the first insulating-filler fabric layer between the first inner fabric layer and the first outer fabric layer. Enclosing the first insulating-filler fabric layer includes quilting the first insulating-filler fabric layer to one or both of the first inner fabric layer and the first outer fabric layer. Enclosing the first insulating-filler fabric layer includes laminating the first insulating-filler fabric layer to one or both of the first inner fabric layer and the first outer fabric layer.

Another aspect of the disclosure provides an insulated composite fabric that includes an outer fabric layer, and an insulating fabric layer attached the outer fabric layer. The insulating fabric layer is a textile fabric having a raised surface facing towards the outer fabric layer.

Implementations of this aspect of the disclosure may include one or more of the following additional features. The insulating fabric layer includes a warp knit fabric. The warp knit fabric has a technical back having plush velvet, and a technical face defining a smooth surface. The insulating fabric layer includes a knit fabric having reverse plaited terry sinker loop construction. The knit fabric has a technical back with a raised or napped surface, and a technical face defining a smooth surface. The insulating fabric layer comprises a terry sinker loop fabric in which the terry loop is left un-raised. The terry sinker loop fabric has a reverse plaited construction. A technical face of the terry sinker loop fabric has a napped finish and a technical back is left as un-napped, terry loop. A technical face of the terry sinker loop fabric is left un-napped and a technical back is left as un-napped, terry loop. The terry sinker loop fabric has a regular plaited construction. The insulating fabric layer has a terry sinker loop surface including a plurality of discrete regions of no terry sinker loop interspersed among regions of terry sinker loop. The insulating fabric layer has a pile surface including a plurality of discrete regions of no pile interspersed among regions of pile. In some cases, the insulating fabric layer has a pile surface that includes a plurality of first discrete regions having a first pile height interspersed among a plurality of other discrete regions having contrasting pile height relatively greater than the first pile height. In some examples, yarns forming the first discrete regions are relatively finer that yarns forming the other discrete regions. In some cases, yarns forming the first discrete regions have a denier per filament (dpf) of less than 1.0. The insulating fabric layer provides insulation of about 0.2 clo/oz$^2$ to about 1.6 clo/oz$^2$. The insulating fabric layer includes a double face warp knit or circular knit fabric. The insulating fabric layer is laminated to the outer fabric layer. The insulating fabric layer is connected to the outer fabric layer by quilting, sewing, tucking, and/or ultrasound bonding. The insulating fabric layer is double face fabric, or a single face textile fabric having the raised surface facing towards the outer fabric layer, and an opposite, smooth surface. The outer fabric layer comprises a woven fabric. The outer fabric layer comprises a knit fabric having a single jersey construction, a warp knit construction, or a mesh construction. The insulated composite fabric has stretch in at least one direction. At least one of the outer fabric layer and the insulating fabric layer includes fibers of stretch and/or elastomeric material (e.g., elastomeric yarn and/or fibers). The outer fabric layer is treated with durable water repellent, an abrasion resistant coating, camouflage, or infrared radiation reduction. The insulated composite fabric has an air permeability of about 1.0 ft$^3$/ft$^2$/min to about 300 ft$^3$/ft$^2$/min, tested according to ASTM D-737 under a pressure difference of ½ inch of water across the insulated composite fabric. The insulating fabric layer and/or the outer fabric layer includes flame-retardant material or is treated to provide flame-retardance. The insulated composite fabric may also include a waterproof membrane that is laminated to an inner surface of the outer fabric layer, and which is disposed between the outer fabric layer and the insulating fabric layer. The waterproof membrane may be a vapor permeable membrane. The waterproof membrane may be a porous hydrophobic membrane, a hydrophilic non-porous membrane, or an electrospun material.

In another aspect of the disclosure features an insulated composite fabric comprising an inner fabric layer, an outer fabric layer, and an insulating-filler fabric layer enclosed between the inner fabric layer and the outer fabric layer. The insulating-filler fabric layer is a textile fabric with a raised surface on at least one side of the fabric. The insulating-filler fabric layer comprises fibers having an axial core surrounded by a multiplicity of radially extending, axially-elongated whiskers, separated by axially-extending grooves.

In another aspect, the disclosure features a fabric garment comprising a first fabric portion formed of a first insulated composite fabric. The first insulated composite fabric comprising a first inner fabric layer, a first outer fabric layer, and a first insulating-filler fabric layer enclosed between the first inner fabric layer and the first outer fabric layer. The first insulating-filler fabric layer is a textile fabric with a raised surface on at least one side of the fabric. The insulating-filler fabric layer comprises fibers having an axial core surrounded by a multiplicity of radially extending, axially-elongated whiskers, separated by axially-extending grooves.

In another aspect, the disclosure features a method comprising forming an insulated composite fabric. The method comprises enclosing an insulating-filler fabric layer between an inner fabric layer and an outer fabric layer. The insulating-filler fabric layer is a textile fabric with a raised surface on at least one side of the fabric. The insulating-filler fabric layer comprises fibers having an axial core surrounded by a multiplicity of radially extending, axially-elongated whiskers, separated by axially-extending grooves.

Implementations of one or more of the above aspects may include one or more following features. The fibers have denier of about 0.3 dpf to about 10.0 dpf or about 1.5 dpf to about 10.0 dpf. The whiskers have an average length of up to about 200% of a diameter of the core. The raised surface comprises the fibers having the axial core surrounded by the multiplicity of radially extending, axially-elongated whiskers, separated by axially-extending grooves. The core comprises a polymer and the whiskers comprise another polymer. The polymer of the core and/or the polymer of the whiskers comprises polyethylene terephthalate (PET), polypropylene (PP), polyamide 6 (PA 6), PA 66, or any of the combinations. The fibers have about 3 to about 200 whiskers within a cross-sectional surface of the fibers. The axially-extending grooves are nanogrooves or microgrooves. The whiskers have an average radial length of about 2 nm to about 10 microns. The insulating-filler fabric layer comprises a double face warp knit fabric, a double face knit fabric having reverse plaited terry sinker loop knit construction, sliver knit construction, a double face knit fabric having sliver knit construction, or a terry sinker loop fabric in which the terry loop is left un-raised. The double face warp knit fabric has a technical back having plush velvet surface, and a technical face having a velour surface. The double face knit fabric has a technical face with a raised or napped surface, and a technical back with a cut loop or velour surface. The terry sinker loop fabric has a reverse plaited construction. A technical face of the terry sinker loop fabric has a napped finish and a technical back is left as un-napped, terry loop. A technical face of the terry sinker loop fabric is left un-napped and a technical back is left as un-napped, terry loop. The terry sinker loop fabric has a regular plaited construction. The insulating-filler fabric layer has a pile surface including a plurality of first discrete regions having a first pile height interspersed among a plurality of other discrete regions having contrasting pile height relatively greater than the first pile height.

Implementations of one or more of the above aspects may include one or more following features. Enclosing the insulating-filler fabric layer comprises sewing the insulating-filler fabric layer to one or both of the inner fabric layer and the outer fabric layer. Enclosing the insulating-filler fabric layer comprises laminating the insulating-filler fabric layer to one or both of the inner fabric layer and the outer fabric layer.

Implementations of the disclosure can include one or more of the following advantages.

In some implementations of the disclosure, the use of a textile fabric as an insulating filler material in an insulated composite fabric can help to avoid the use of loose fibers, which may have a tendency to migrate. This can also allow various fabrics with various openness to be used as shell layers with reduced concern over fiber migration and penetration of loose fibers through the shell fabric and without having to seal or otherwise limited the air permeability of the shell fabric.

In some implementations of the disclosure, an insulating filler material is made of pile (velvet) and/or velour/fleece, which includes face yarn positioned generally perpendicular to backing or stitching yarn. This type of construction can provide high thickness (bulk) with good resiliency to help maintain thermal insulation even following compression.

Other aspects, features, and advantages of the disclosure are in the description, drawings, and claims.

DESCRIPTION OF DRAWINGS

Like reference symbols in the various drawings indicate like elements.

DETAILED DESCRIPTION

Figure 1:
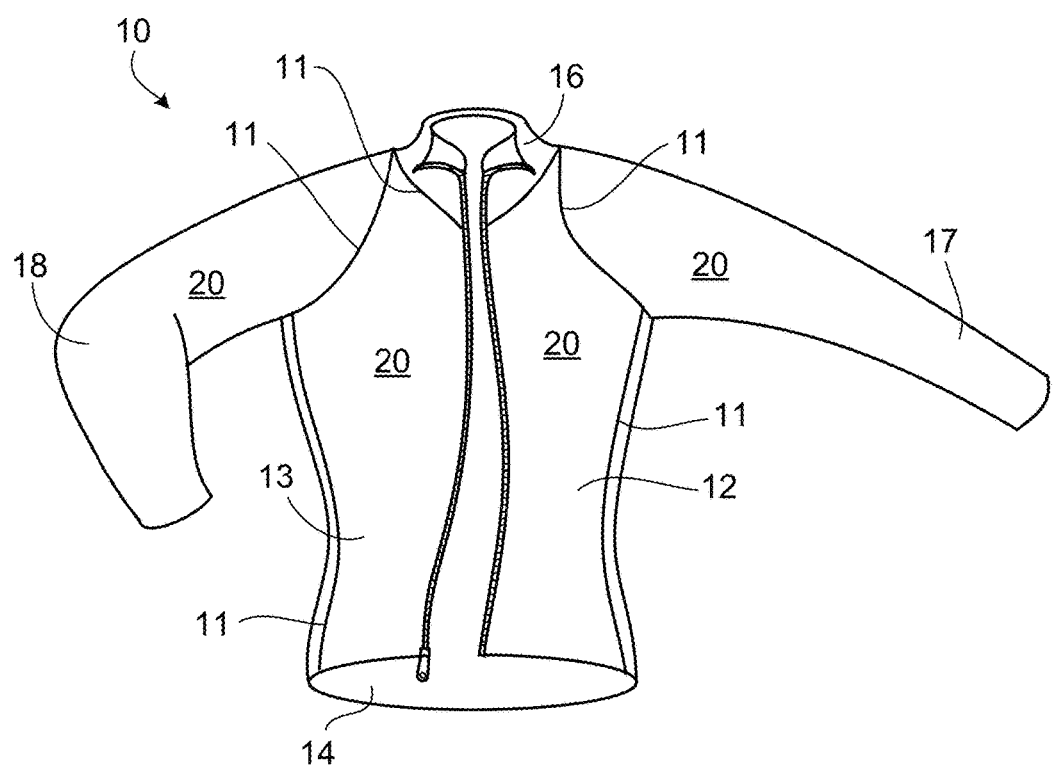
FIG. 1 is a front perspective view of an insulated fabric garment.
Figure 2:
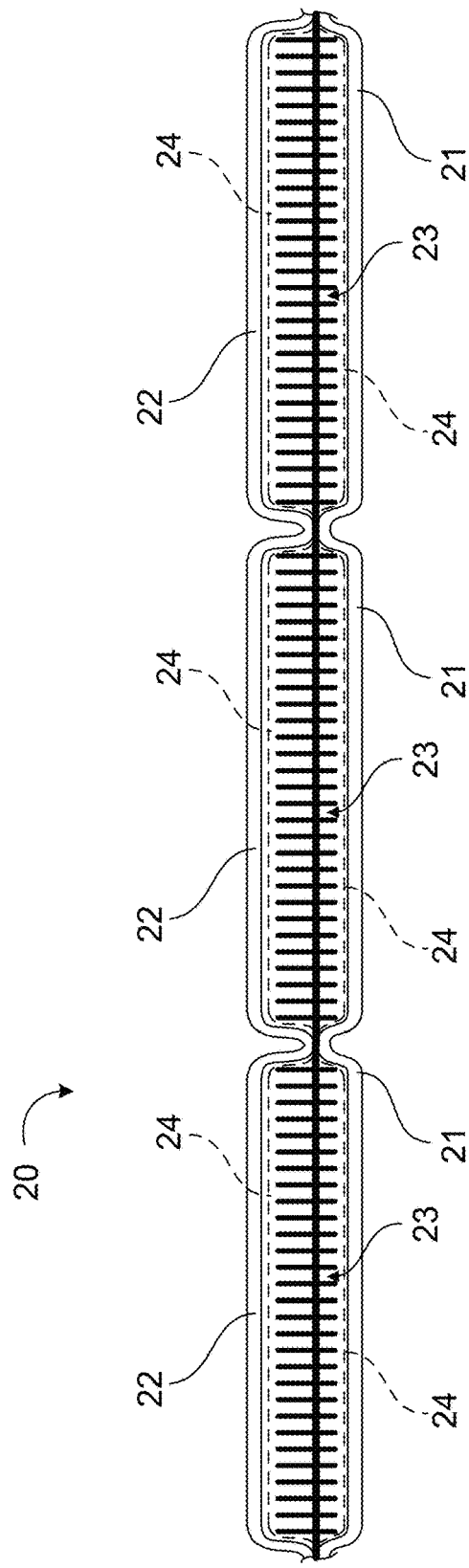
FIG. 2 is an end section view of an insulated composite fabric.

Referring to FIG. 1, an insulated fabric garment 10 is formed from a plurality of fabric elements that are joined together, e.g. by stitching at seams 11. The fabric elements include left and right front elements 12, 13, a rear element 14, a collar element 16, and left and right arm elements 17, 18. Each of these fabric elements consists of an insulated composite fabric ("technical down"). FIG. 2 illustrates an insulated composite fabric 20 that is suitable for forming the fabric elements. The insulated composite fabric 20 consists of an inner "shell-liner" fabric layer 21, which forms an inner surface of the fabric garment 10 worn towards a user's body; an outer "shell" fabric layer 22, which forms an outer surface of the fabric garment 10; and an insulating-filler fabric layer 23 enclosed therebetween. The insulating-filler fabric layer 23 can be sewn (e.g., quilted (as illustrated in FIG. 2) and/or connected with tack stitches) to one or both of the inner and outer fabric layers 21, 22, or, in some cases, a loose insulating-filler fabric layer 23 is anchored in the seams 11 of the fabric garment 10 and/or along the periphery of the individual fabric elements. Alternatively or additionally, the insulating-filler fabric layer 23 can be attached to one or both of the inner and outer fabric layers 21, 22 by other physical anchoring, e.g., via snapping, tucking, jumping and tucking, ultrasound bonding, lamination, etc.

The insulating-filler fabric layer 23 is a textile fabric with raised surface on one side or both sides. The textile fabric of the insulating-filler fabric layer 23 is constructed to include face yarn (pile) that is positioned generally perpendicular to stitching or backing yarn. The term "pile," as used herein, includes pile surfaces formed by any desired method, including but not limited to cut loops, loops cut on the knitting machine, loops cut off the knitting machine, and raised fibers. This type of construction can provide high bulk with good resiliency to maintain the thermal insulation of the insulating-filler fabric layer 23 even under compression.

Figure 3:
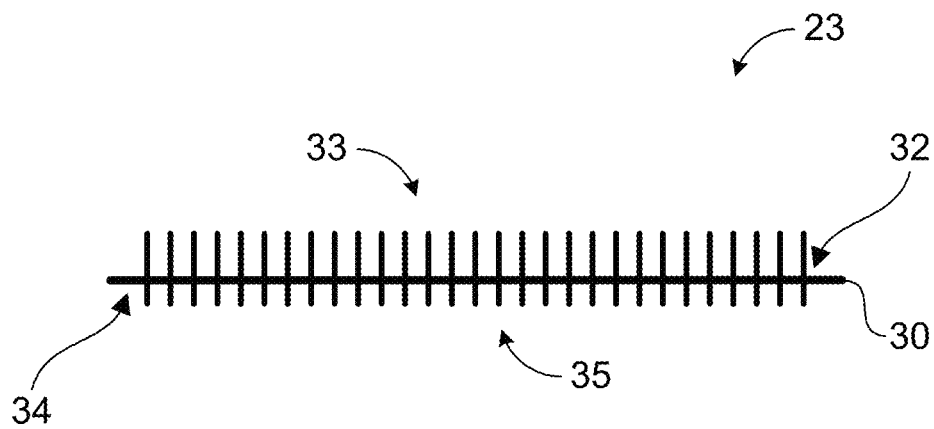
FIG. 3 is an end section view of an insulating-filler fabric in the form of a double face warp knit fabric.

Referring to FIG. 3, the insulating-filler fabric layer 23 may be formed from a double face warp knit fabric 30 that includes a technical back 32 formed of pile yarns that are brushed to provide a plush velvet surface 33, and a technical face 34 formed of backing yarns and stitching yarns. The backing yarns or the stitching yarns of the technical face 34 may be napped to form a fleece/velour 35. Alternatively, in some cases, some of the pile yarns overlay the stitch yarn at the technical face 35 and may brushed or napped to form a fleece/velour 35 surface at the technical face 35. Additional details regarding the construction of a suitable double face warp knit fabric may be found in U.S. Pat. No. 6,196,032, issued Mar. 6, 2001, U.S. Pat. No. 6,199,410, issued Mar. 13, 2001, U.S. Pat. No. 6,832,497, issued Dec. 21, 2004, U.S. Pat. No. 6,837,078, issued Jan. 4, 2005, and U.S. Pat. No. 5,855,125, issued Jan. 5, 1999, the complete disclosures of all of which are incorporated herein by reference. Suitable double face warp knit fabrics are commercially available, e.g., from Polartec, LLC, of Lawrence, Mass., under the trademark BOUNDARY®.

Figure 4:
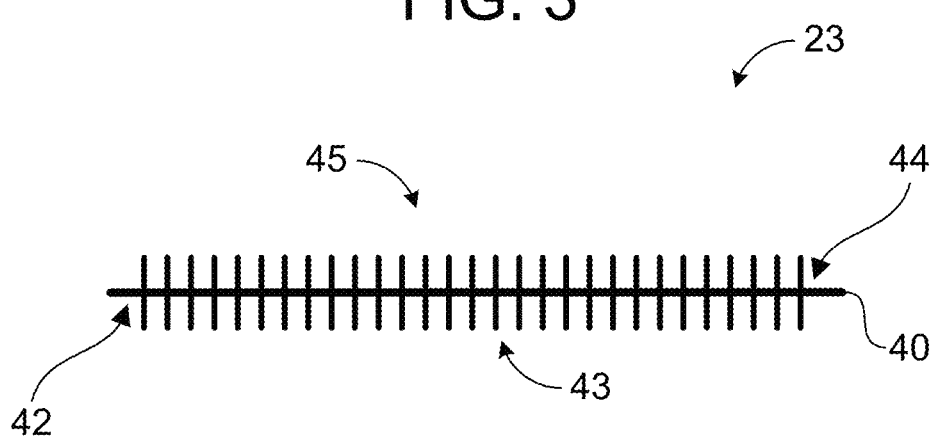
FIG. 4 is an end section view of an insulating-filler fabric in the form of a double face knit fabric with reverse plaited terry sinker loop knit construction.

Alternatively or additionally, the insulating-filler fabric layer 23 may be formed from a double face knit fabric having reverse plaited terry sinker loop knit construction. Referring to FIG. 4, the double face knit fabric with reverse plaited terry sinker loop knit construction 40 has a technical face 42 with a raised or napped surface 43, and a technical back 44 in which sinker loops are sheared to form a cut loop velvet surface 45. Additional details regarding the construction of a suitable double face knit fabric with reverse plaited terry sinker loop knit construction may be found in U.S. Pat. No. 6,131,419, issued Oct. 17, 2000, the complete disclosure of which is incorporated herein by reference.

Figure 5:
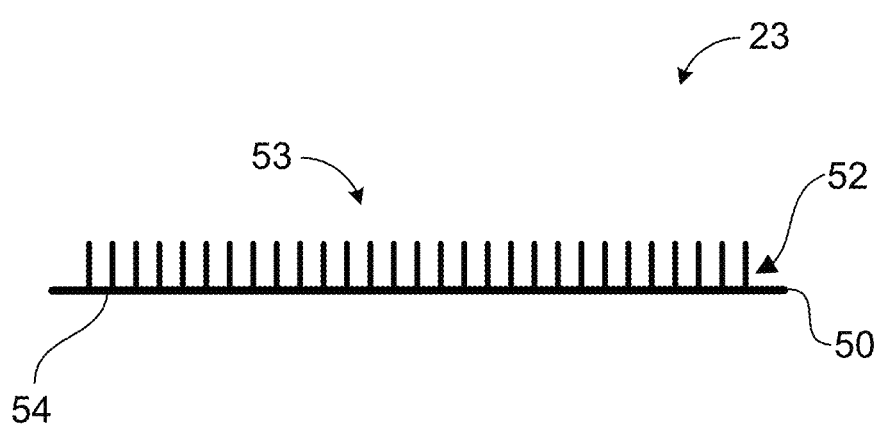
FIG. 5 is an end section view of an insulating-filler fabric in the form of a single face fabric.

Referring to FIG. 5, the insulating-filler fabric layer 23 may also be formed from a single face fabric 50 that is constructed to include a technical face 52 with face yarn that is positioned generally perpendicular to stitching or backing yarn 54.

Alternatively or additionally, the insulating-filler fabric layer 23 may be formed from a fabric having a sliver knit construction. The sliver knit construction can be formed by circular knitting coupled with the drawing-in of sliver of fibers to produce a pile like fabric. The sliver knit construction allows for the use of relatively coarse fiber (e.g., 5 dpf to 15 dpf). This relatively coarse fiber can provide for good resiliency and resistance to compression, and can generate very high pile (e.g., pile height of 3 inches to 4 inches). The sliver fabric of the insulating-filler fabric layer can be finished as a single face fabric with a raised surface at the technical back, or as a double face fabric with raised surfaces on both the technical back and the technical face. Generally, the sliver knit construction is prone to "shedding" and may exhibit undesirable aesthetic appearance (e.g., poor finish) when raised on the technical face. However, when incorporated as a filler layer, the aesthetic appearance of the raised technical face is less critical since the fabric is enclosed between the outer "shell" fabric layer 22 and the inner "shell-liner" fabric layer 21.

In some cases, the insulating-filler fabric layer 23 may include elastomeric material for enhanced stretch and recovery. For example, the insulating-filler fabric layer 23 may include elastomeric yarns and/or fibers, e.g., incorporated in the backing or stitching yarns. In some examples, the insulating-filler fabric layer 23 has stretch without including elastomeric material.

The insulating-filler fabric layer 23 has a weight of about 1 ounce per square yard to about 12 ounces per square yard, has relatively high thickness (bulk) (e.g., a thickness of at least about 0.1 inch, e.g., about 0.1 inch to about 1.0 inch), and has high insulation per weight unit (e.g., about 0.2 $clo/oz^2$ to about 1.6 $clo/oz^2$).

The insulating-filler fabric layer 23 may consist of a hydrophobic fabric, which, in case of water penetration through the outer fabric layer 22 (FIG. 2) will not be held or absorbed, and will be able to dry fast.

The inner and outer fabric layers 21, 22 (FIG. 2) can both be made of woven fabric. Alternatively, in some cases, the inner "shell-liner" fabric layer 21 and/or the outer "shell" fabric layer 22 may instead consist of a knit fabric, such as a knit fabric having a single jersey construction, a double knit construction, a warp knit construction, or a mesh construction. The respective fabrics of the inner and outer fabric layers 21, 22 may be formed of synthetic yarns and/or fibers, regenerated yarns and/or fibers, natural yarns and/or fiber, and combinations thereof.

In some cases, the inner fabric layer 21 and/or the outer fabric layer 22 can also include elastomeric material, such as elastomeric yarns and/or fibers incorporated in the construction of the respective fabrics, for enhanced stretch and recovery. The incorporation of elastomeric material in the inner and outer fabric layers 21, 22 can be particularly beneficial where the insulating-filler fabric layer 23 also has stretch, such that the inner fabric layer 21 and the outer fabric layer 22 can stretch and move with the insulating filler layer 23 for enhanced user comfort.

The moisture vapor transmission rate and the air permeability of the insulated composite fabric 20 can be controlled by the void or openness of the fabrics of the inner and/or outer fabric layers 21, 22. In some cases, for example, the control of the air permeability of the insulated composite fabric 20 can be achieved by controlling one or more parameters (e.g., yarn size, yarn count, and/or weave density (pick/fill)) of the fabric forming the inner "shell-liner" fabric layer 21 and/or the outer "shell" fabric layer 22. Alternatively or additionally, the control of the air permeability of the insulated composite fabric 20 can be achieved by applying coating or film lamination 24 (FIG. 2) to one or more surfaces of the inner fabric layer 21 and/or the outer fabric layer 22.

The respective fabrics of the inner and outer fabric layers 21, 22 can be selected to provide the insulated composite fabric 20 with an air permeability within a range of about 1.0 $ft^3/ft^2/min$ to about 300 $ft^3/ft^2/min$ according to ASTM D-737, under a pressure difference of ½ inch of water across the insulated composite fabric 20. Depending on the particular construction, the composite fabric 20 may be tailored toward different end uses. For example, the insulated composite fabric 20 can be constructed to provide cold weather insulation with relatively high air permeability for use in conditions of relatively high physical activity. In this case, the respective fabrics of the inner and outer fabric layers 21, 22 can be selected to provide the insulated composite fabric 20 with an air permeability of about 100 ft$^3$/ft$^2$/min to about 300 ft$^3$/ft$^2$/min according to ASTM D-737, under a pressure difference of ½ inch of water across the insulated composite fabric 20.

Alternatively, the insulated composite fabric 20 can be constructed to provide cold weather insulation with relatively low air permeability for use in conditions of relatively little physical activity. In this case, the respective fabrics of the inner and outer fabric layers 21, 22 can be selected to provide the insulated composite fabric 20 with an air permeability of about 1 ft$^3$/ft$^2$/min to about 80 ft$^3$/ft$^2$/min according to ASTM D-737, under a pressure difference of ½ inch of water across the insulated composite fabric 20. The complete disclosures of the test method ASTM D-737 is incorporated herein by reference.

In some cases, the inner fabric layer 21 can have a relatively higher air permeability than the fabric of the outer fabric layer 22. Utilizing fabric with higher air permeability for the inner fabric layer 21, which is worn towards the user's body, can help to enhance vapor movement and vapor transmission away from the user's body during periods of high activity to help prevent overheating. For example, the inner fabric layer 21 may have an air permeability of about 5 ft$^3$/ft$^2$/min to about 300 ft$^3$/ft$^2$/min, tested according to ASTM D-737, under a pressure difference of ½ inch of water across the inner fabric layer 21, and the outer fabric layer 22 may have an air permeability of about 1 ft$^3$/ft$^2$/min to about 100 ft$^3$/ft$^2$/min (e.g., about 1 ft$^3$/ft$^2$/min to about 30 ft$^3$/ft$^2$/min), tested according to ASTM D-737, under a pressure difference of ½ inch of water across the outer fabric layer 22.

Further description is provided by the following examples, which do not limit the scope of the claims

EXAMPLES

Example 1

Figure 6:
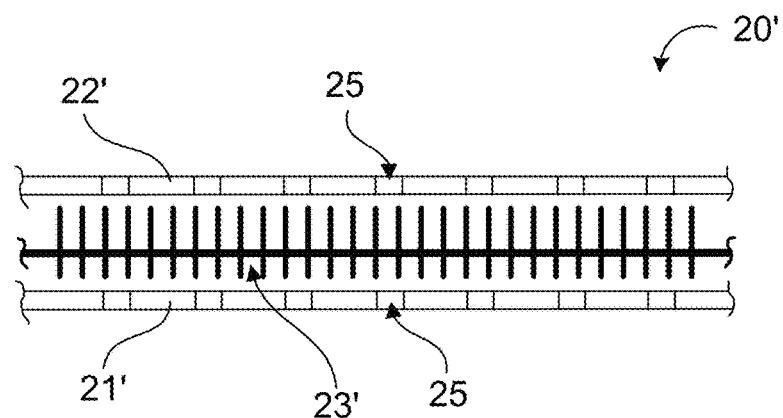
FIG. 6 is end section view of insulated composite having a light-duty construction.

FIG. 6 illustrates one example of an insulated composite fabric 20' with a light-duty construction. The fabric includes an inner fabric layer 21', an outer fabric layer 22', and an insulating-filler fabric layer 23' enclosed therebetween. Both the inner fabric layer 21' and the outer fabric layer 22' consist of a knit fabric with mesh construction. The mesh construction of the inner and outer fabric layers 21', 22' has a plurality of openings 25. The insulating-filler fabric layer 23' consists of a double face knit fabric (e.g., double face warp knit, double face knit with raised sinker terry loop construction, or double face sliver knit) having a weight of about 1 ounce per square yard to about 4 ounces per square yard, and a bulk (thickness) of about 0.1 inch to about 0.2 inch. The insulating-filler fabric layer 23' is sewn (e.g., quilted) to one or both of the inner and outer fabric layers 21', 22'. The light-duty insulated composite fabric 20' provides insulation of about 0.8 clo/oz$^2$ to about 1.6 clo/oz$^2$.

Example 2

Figure 7:
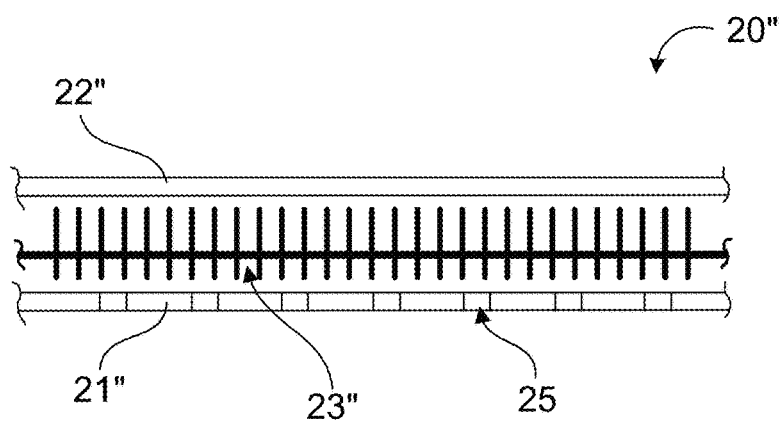
FIG. 7 is end section view of insulated composite having a medium-duty construction.

FIG. 7 illustrates an insulated composite fabric 20'' with a medium-duty construction. The medium-duty insulated composite fabric 20'' includes an inner fabric layer 21'' consisting of a knit fabric with mesh construction, an outer fabric layer 22'' consisting of a woven fabric, and an insulating-filler fabric layer 23'' enclosed there between. The insulating-filler fabric layer 23'' consists of a double face knit fabric (e.g., double face warp knit, double face knit with raised sinker terry loop construction, or double face sliver knit) having a weight of about 3 ounces per square yard to about 8 ounces per square yard, and a bulk (thickness) of about 0.15 inch to about 0.4 inch. The insulating-filler fabric layer 23'' is sewn (e.g., quilted) to one or both of the inner and outer fabric layers 21'', 22''. The medium-duty insulated composite fabric 20'' provides insulation of about 1.0 clo/oz$^2$ to about 1.8 clo/oz$^2$.

Example 3

Figure 8:
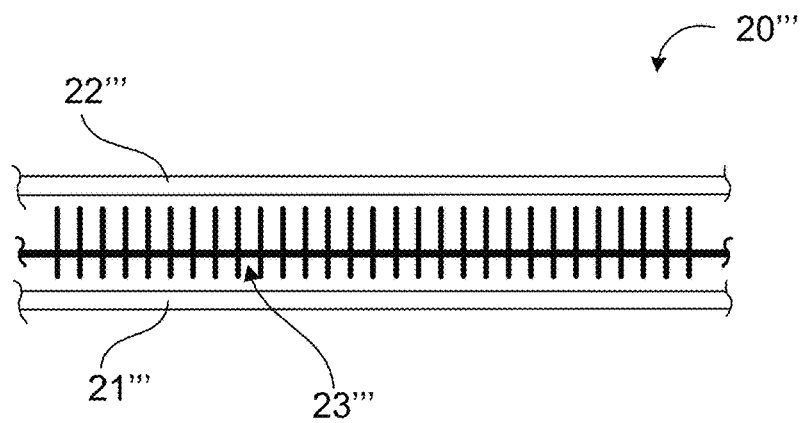
FIG. 8 is end section view of insulated composite having a heavy-duty construction.

FIG. 8 illustrates an insulated composite fabric 20''' with a heavy-duty construction. The heavy weight insulated composite fabric 20''' includes an inner fabric layer 21''', an outer fabric layer 22''', and an insulating-filler fabric layer 23''' enclosed there between. In this heavy-duty construction, both the inner fabric layer 21''' and the outer fabric layer 22''' consist of a woven fabric. The insulating-filler fabric layer 23''' consists of a double face knit fabric (e.g., double face warp knit, double face knit with raised sinker terry loop construction, or double face sliver knit) having a weight of about 4 ounces per square yard to about 12 ounces per square yard, and a bulk (thickness) of about 0.2 inch to about 1.0 inch. The insulating-filler fabric layer 23''' is sewn (e.g., quilted) to one or both of the inner and outer fabric layers 21''', 22'''. The heavy-duty insulated composite fabric 20''' provides insulation of about 1.0 clo/oz$^2$ to about 3.0 clo/oz$^2$ Other Implementations While certain implementations have been described above, other implementations are possible.

For example, an entire fabric garment may be constructed from the insulted composite fabric, or, in some cases, a fabric garment may be formed which includes the insulated composite fabric only in sections.

Figure 9:
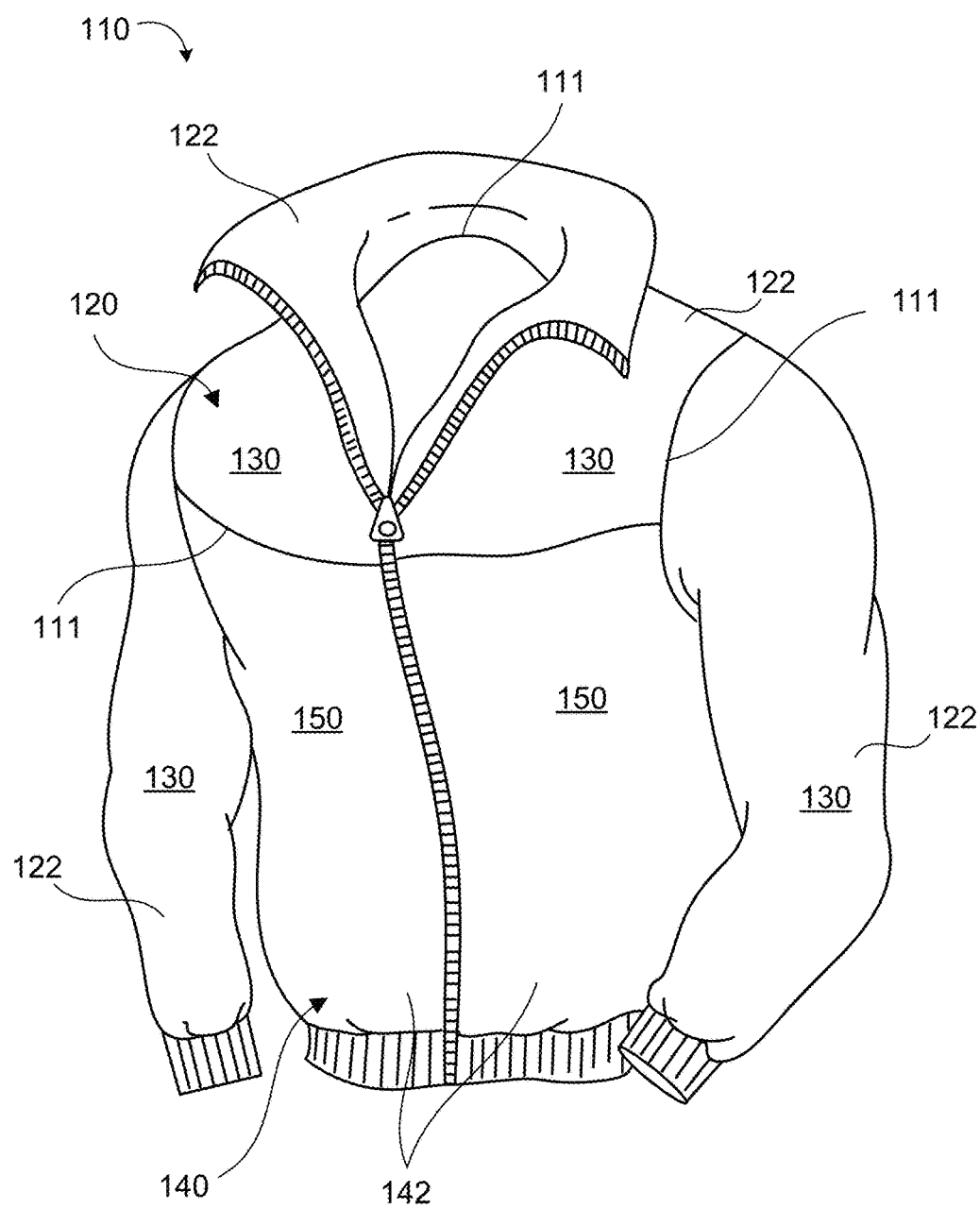
FIG. 9 is a front perspective view of a hybrid insulated fabric garment.
Figure 10:
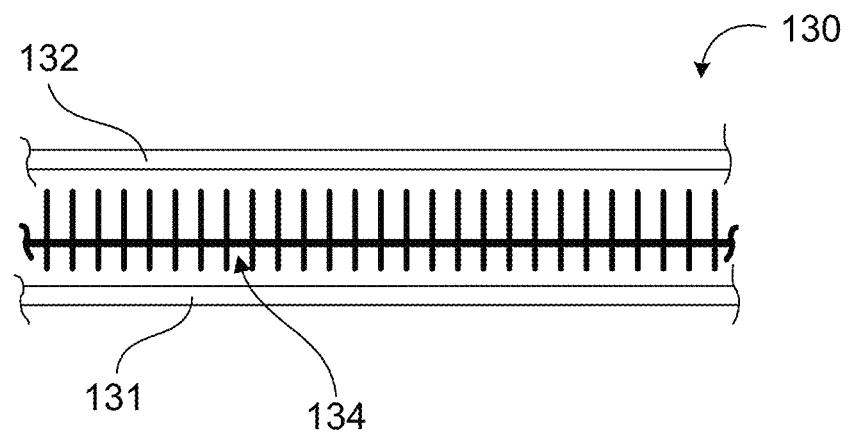
FIG. 10 is an end section view of an example of an insulated composite fabric for use in a first fabric portion of the hybrid insulated fabric garment of FIG. 9.

FIG. 9 illustrates a hybrid insulated fabric garment 110 in the form of a jacket that includes a first fabric portion 120 and a second fabric portion 140. The first fabric portion 120 covers the user's shoulder regions and extends below the elbows down towards the user's wrists. The first fabric portion 120 is formed of a plurality of first fabric elements 122 that are joined together by stitching at seams 111. The first fabric elements 122 are formed from a first insulated composite fabric 130, which may have a construction as described above with regard to FIG. 2. Referring to FIG. 10, the first insulated composite fabric 130 includes a first inner fabric layer 131 that forms an inner surface of the fabric garment 110 worn towards the user's body, a first outer fabric layer 132 that forms an outer surface of the fabric garment 110, and a first insulating-filler fabric layer 134 consisting of a textile fabric with a raised surface on at least one side of the fabric (a double face fabric is shown in FIG. 10). The first insulating-filler fabric layer 134 is enclosed between the first inner fabric layer 131 and the first outer fabric layer 132. The first insulated composite fabric 130 has an air permeability of about 1.0 ft$^3$/ft$^2$/min to about 80.0 ft$^3$/ft$^2$/min (e.g., about 4.0 ft$^3$/ft$^2$/min to about 20.0 ft$^3$/ft$^2$/min) tested according to ASTM D-737, under a pressure difference of ½ inch of water across the first insulated composite fabric 130.

Figure 11:
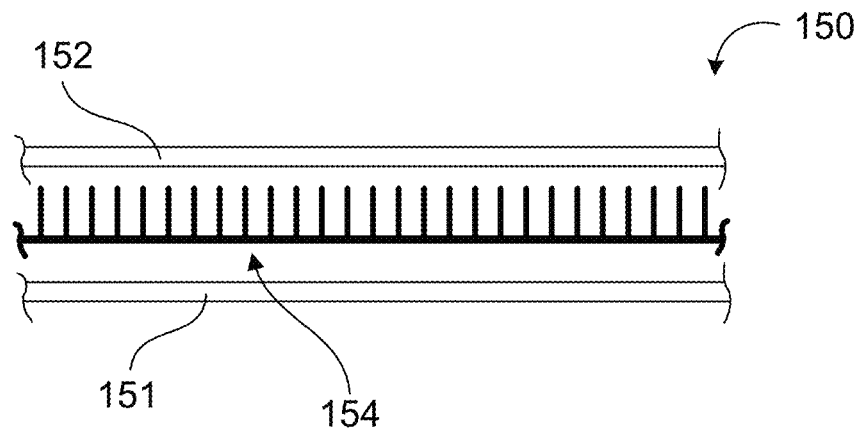
FIG. 11 is an end section view of an example of an insulated composite fabric for use in a second fabric portion of the hybrid insulated fabric garment of FIG. 9.

The second fabric portion 140 covers a lower torso region of the user's body and is formed of a plurality of second fabric elements 142, which are joined together and with the first fabric elements 122 by stitching at seams 111. The second fabric elements 142 are formed from a second insulated composite fabric 150, which, like the first insulated composite fabric 130, may also have a construction as described above with regard to FIG. 2. With reference to FIG. 11, the second insulated composite fabric 150 includes a second inner fabric layer 151, which forms an inner surface of the fabric garment 110; a second outer fabric layer 152, which forms an outer surface of the fabric garment 110; and a second insulating-filler fabric layer 154 consisting of a textile fabric with a raised surface on at least one side of the fabric. A single face fabric is shown in FIG. 11; however, the second insulating-filler fabric layer 154 may, alternatively or additionally, include a double face fabric, e.g., a double face fabric with relatively lower thickness than the fabric of the first insulating-filler fabric layer 134. The second insulating-filler fabric layer 154 is enclosed between the second inner fabric layer 151 and the second outer fabric layer 152. The second insulated composite fabric 150 is constructed to have an air permeability that is different from, and relatively greater than, the air permeability of the first insulated composite fabric 130. The second insulated composite fabric 150 has an air permeability of about 5 ft$^3$/ft$^2$/min to about 300 ft$^3$/ft$^2$/min tested according to ASTM D-737, under a pressure difference of ½ inch of water across the second insulated composite fabric 150.

Alternatively or additionally, the first and second fabric portions 120, 140 can have contrasting stretch. For example, the first fabric portion 120 may have greater stretch (e.g., in the outer shell, the inner shell layer, and the insulting-filler) than the second fabric layer 140. Providing greater stretch in the shoulder regions, for example, may enhance wearer comfort and reduce resistance while moving the arms, while other parts, e.g., the second fabric portion, may be non-stretch.

In some cases, the second fabric elements 142 may, instead, consist of a plain textile fabric, e.g., a circular knit like single jersey (plaited or non-plaited), double knit, rib, warp knit, or woven with and/or without stretch. Or, as another alternative, the second fabric elements 142 may consist of a double face knit fabric having reverse plaited terry sinker loop knit construction. Suitable fabrics for forming the second fabric elements 142 are commercially, available, e.g., from Polartec, LLC, of Lawrence, Mass., under the trademarks POWER STRETCH® and BOUNDARY®.

In some cases, the second fabric elements 142 may be formed of a laminate composite fabric with outer and inner fabric layers; and a barrier resistant to wind and liquid water while providing water vapor transport through absorption-diffusion-desorption, including a hydrophilic barrier and/or adhesive layer adhered to the inner and/or outer fabric layer. Suitable laminate composite fabrics are commercially available, e.g., from Polartec, LLC, of Lawrence, Mass., under the trademarks WINDBLOC® and POWER SHIELD®.

Figure 12:
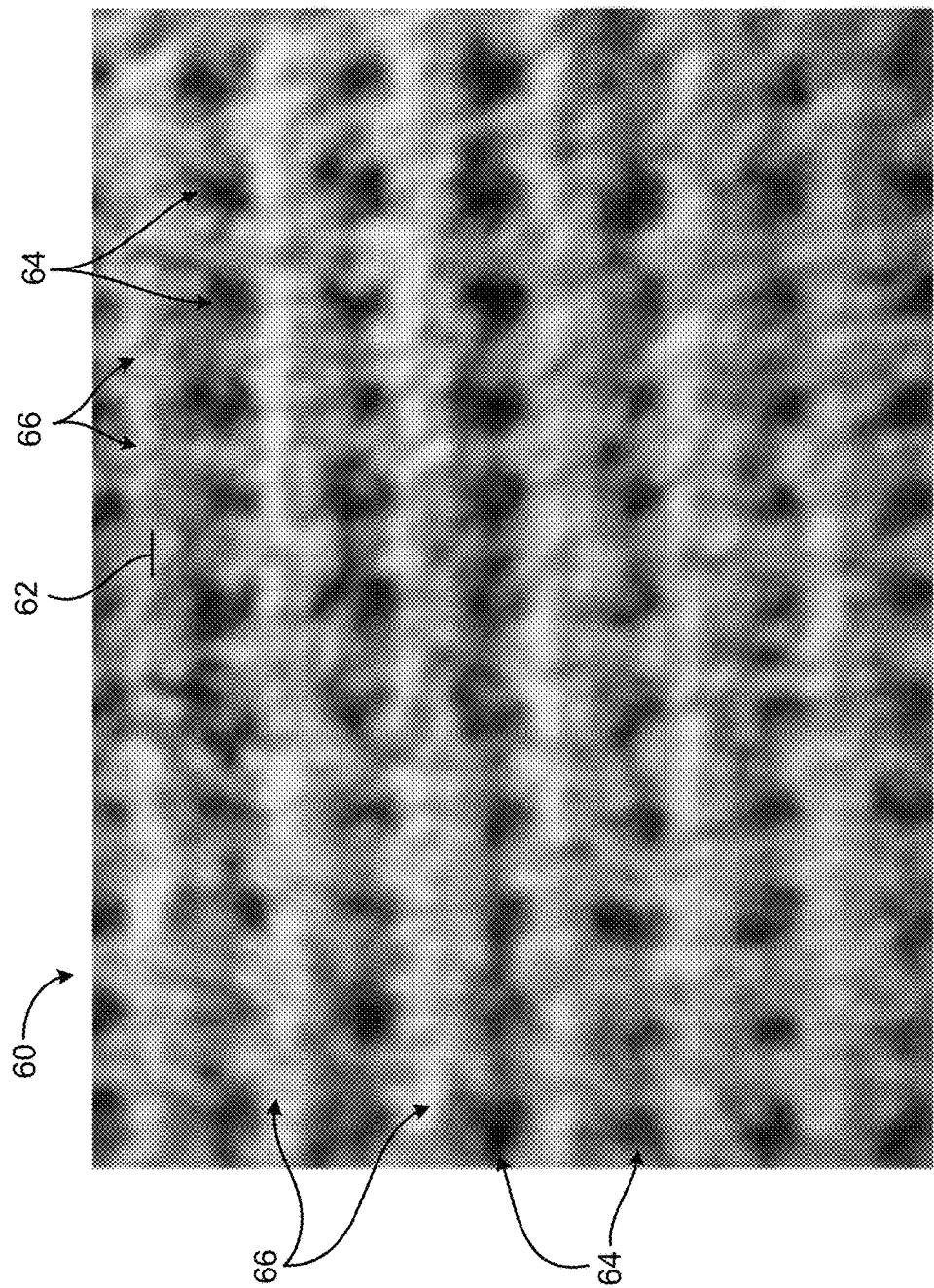
FIG. 12 is a plan view of an insulating-filler fabric having a pile surface that includes no pile regions interspersed among regions of pile.

In some cases, enhancing the packability or compression (i.e., reducing the total volume of the insulated composite fabric) can be achieved by having voids or pile out (i.e., regions of no pile) in a predetermined pattern in the insulating-filler fabric layer. For example, FIG. 12 shows a raised surface knit fabric 60 having a first pile surface 62 that includes regions of no pile 64 interspersed among regions of pile 66 (e.g., pile having a height of at least about 2.0 mm. About 5% to about 70% of the surface area of the insulating-filler fabric can be covered by no pile regions.

Figure 13A:
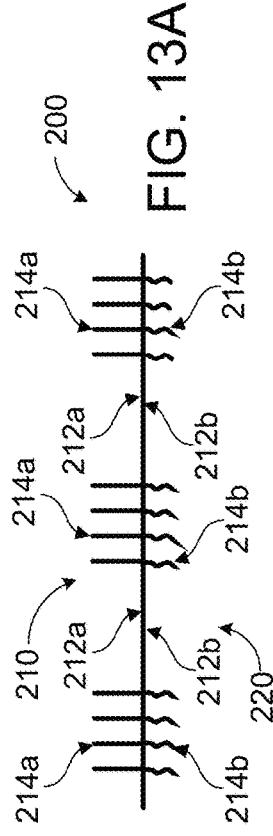
FIGS. 13A-13E are end section views illustrating insulating-filler fabrics having void regions (i.e., regions of relatively lower pile or no pile).

As mentioned above, the raised surface knit fabric of the insulating filler layer may have a construction made on a warp knitting double needle bar raschel machine, where the pile yarns are grouped in a predetermined pattern and some predetermined sections have voids (no pile yarn). For example, FIG. 13A illustrates an embodiment of such a raised surface knit fabric 200 having a first pile surface 210 on the technical back that includes void regions 212a (e.g., regions of no pile) interspersed between regions of pile 214a. The fabric 200 also includes a second pile surface 220 (after raising) on the technical face. As shown in FIG. 13A, the second pile surface 220 also includes void regions 212b (e.g., regions of no pile) interspersed between regions of pile 214b. When incorporated into an insulated composite fabric, such as described above, the pile yarn on the technical back and on the technical face (after raising) will keep the outer "shell" and the inner "shell-liner" fabric layers spaced apart, entrapping stagnant air, maximizing thermal insulation of the insulated composite fabric. The air entrapped between the shell and the shell-liner in the regions of no pile, will provide good thermal in static condition at very low air movement or wind.

Figure 13B:
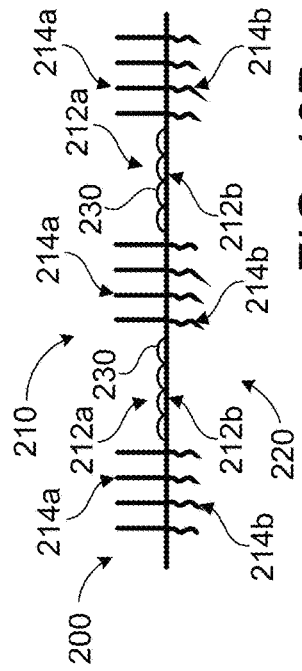
Figure 13C:
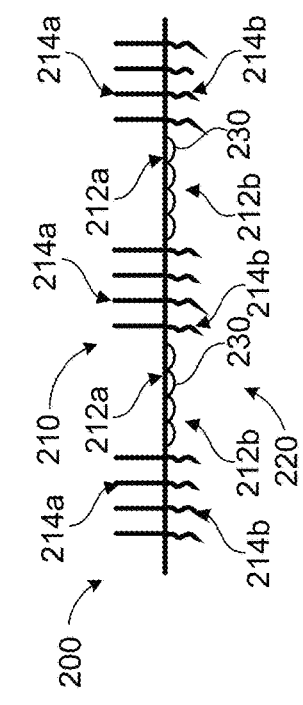
Figure 13D:
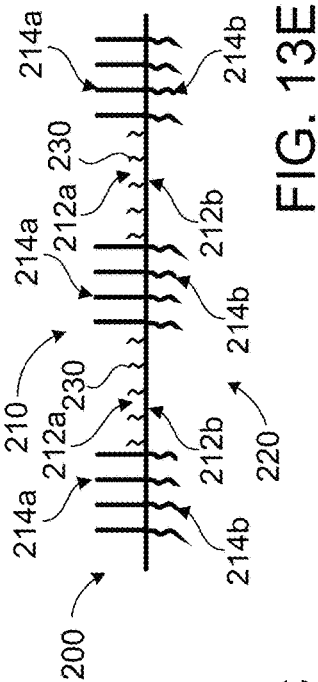
Figure 13E:
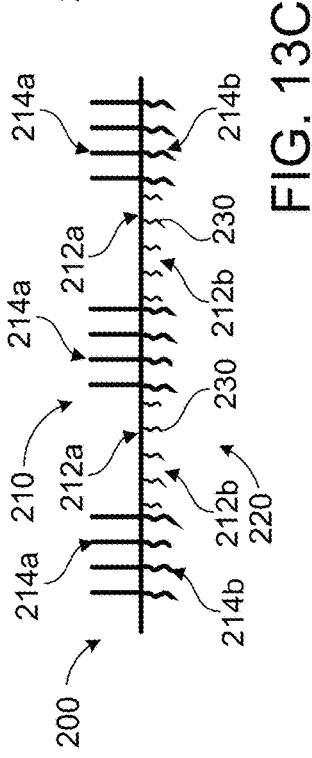

In dynamic conditions (air flow or wind blowing onto the shell material having controlled air permeability), the thermal insulation in the void region may be reduced. However, the loss of thermal insulation can be reduced by providing relative low fleece/velour (lower than the interconnecting pile) in the void regions 212a, 212b. This can be done by adding additional pile yarn 230 (preferably in fine dpf like micro fiber under 1.0 denier) without generating interconnecting pile, but which is held by the stitch and backing yarn along the technical face (FIG. 13B) and/or along the technical back (FIG. 13D), and generating fleece/velour on the technical face upon raising the additional pile yarn 230 by napping (FIG. 13C) and/or generating fleece on the technical back upon raising the additional pile yarn 230 by napping (FIG. 13E). This low fleece/velour (much lower than that formed by the interconnecting pile) in the void region with improved tortuousity and reduced air movement (keeping entrapped air stagnate) to reduce thermal heat loss by convection.

While implementations of insulating-filler fabrics have been described which include one or more raised surfaces, in some implementations, e.g., where less insulation is needed, the insulating-filler fabric may instead have a regular knit construction (single or double face) which is finished on one or both sides by brushing.

In some cases, the outer "shell" fabric layer, the inner "shell-liner" fabric layer, and/or the insulating-filler fabric layer may be formed of, and/or incorporate, flame-retardant materials (e.g., flame retardant fibers), or may be treated (e.g., chemically treated) to provide flame-retardance. In some implementations, the outer "shell" fabric layer is treated with durable water repellent (DWR), an abrasion resistant coating, camouflage, and/or infrared radiation reduction.

Figure 14A:
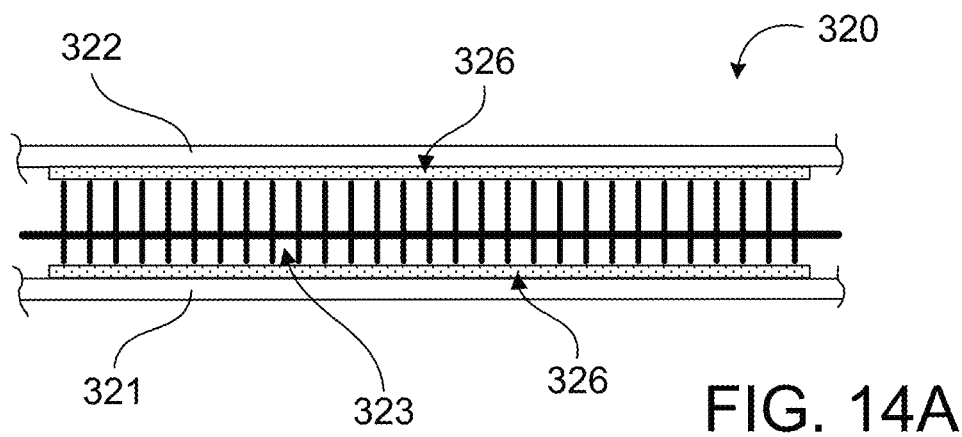
FIGS. 14A-14C are end section views of alternative embodiments of an insulated composite fabric laminate.

Although embodiments of insulated composite fabrics have been described in which an insulating-filler fabric layer is attached to one or both of a inner fabric layer and an outer fabric layer by sewing, in some cases, the insulating-filler fabric layer may be laminated to one or both of the inner fabric layer and the outer fabric layer. FIG. 14A illustrates an insulated composite fabric laminate 320. The insulated composite fabric laminate 320 includes an inner fabric layer 321, an outer fabric layer 322, and an insulating-filler fabric layer 323 enclosed therebetween. The insulating-filler fabric layer 323 consists of a double face knit fabric that is bonded to the inner fabric layer 321 and the outer fabric layer 322 with an adhesive 326. The adhesive can applied in a manner to substantially avoid further limiting the air permeability of the insulated composite fabric laminate 320. The adhesive can be applied, for example, in a dot coating pattern.

Figure 14B:
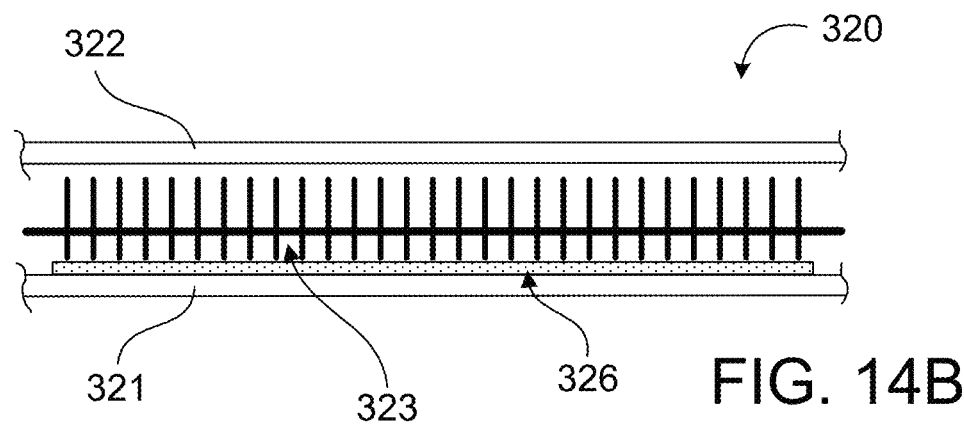
Figure 14C:
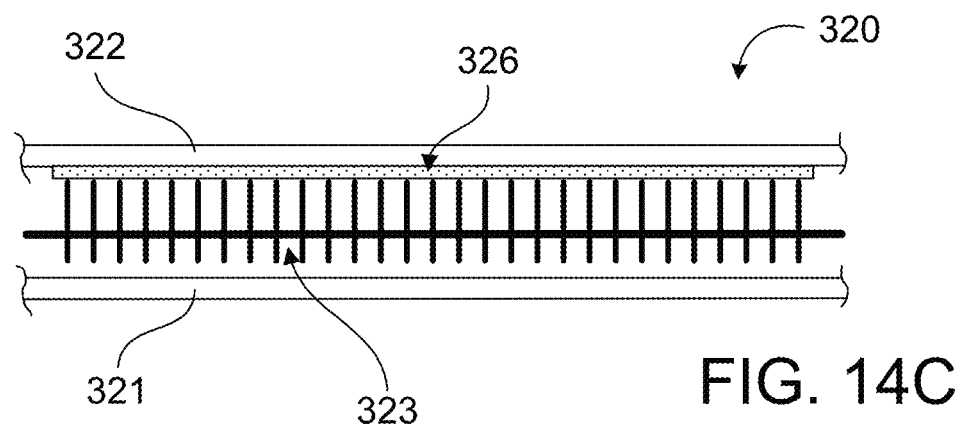

FIG. 14B illustrates an alternative embodiment in which the insulating-filler fabric layer 323 is laminated only to the inner fabric layer 321, and FIG. 14C illustrates an alternative embodiment in which the insulating filler fabric layer 323 is laminated only to the outer fabric layer 322.

Figure 15A:
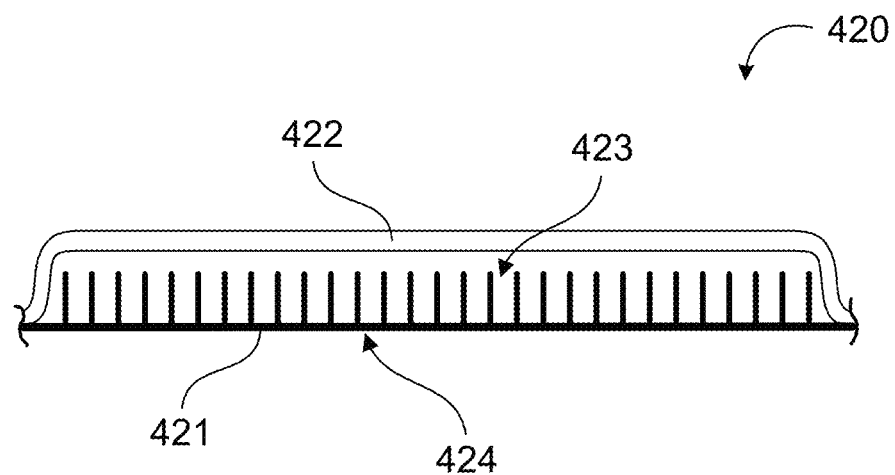
FIG. 15A is an end section view of a two layer insulated composite fabric.

FIG. 15A illustrates yet another example of an insulated composite fabric 420. The insulated composite fabric 420 of FIG. 15A includes an outer "shell" fabric layer 422 and an inner, insulating fabric layer 421. The outer fabric layer 422 consists of a woven fabric. The insulating fabric layer 421 consists of a single face knit fabric (e.g., single face warp knit, single face knit with raised sinker terry loop construction, or single face sliver knit) having a raised surface 423 (pile or velour) and an opposite, smooth surface 424. The insulating fabric layer 421 is attached to the outer fabric layer 422 (e.g., by sewing (e.g., quilting at any pattern, sewing, tucking, ultrasound bonding, or tack stitching), lamination, anchored by stitching along seams, or other physical anchoring like snapping, etc.) such that the raised surface 423 faces toward the outer fabric layer 422. The smooth surface 424 of the insulating fabric layer 421 forms an exposed surface of the insulated composite fabric 420. The insulated composite fabric 420 can be incorporated in a fabric garment such as any of the garments described above. For example, the insulated composite fabric 420 of FIG. 14 could be used in the first fabric portion or the second fabric portion of the jacket of FIG. 9. When incorporated in a fabric garment, the smooth surface 424 of the insulating fabric layer 421 can be arranged to form an inner surface of the garment worn towards the user's body.

Either or both of the insulating fabric layer 421 and the outer fabric layer 422 can have stretch in at least one direction. In some cases, for example, either or both of the insulating fabric layer 421 and the outer fabric layer 422 can include elastomeric material (e.g., spandex yarns and/or fibers) for enhanced stretch and shape recovery.

Referring still to FIG. 15A, the moisture vapor transmission rate and the air permeability of the insulated composite fabric 420 can be controlled by the void or openness of the fabric of the outer fabric layer 422. In some cases, for example, the control of the air permeability of the insulated composite fabric 420 can be achieved by controlling one or more parameters (e.g., yarn size, yarn count, and/or weave density (pick/fill)) of the fabric forming the outer fabric layer 422. Alternatively or additionally, the control of the air permeability of the insulated composite fabric 420 can be achieved by applying coating or film lamination to one or both surfaces of the outer fabric layer 422.

Figure 15B:
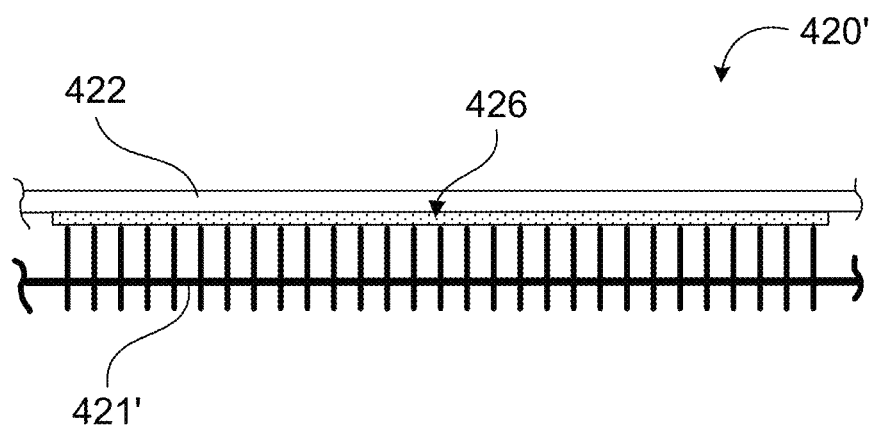
FIG. 15B is an end section view of a two layer insulated composite fabric laminate.

FIG. 15B illustrates yet another example of an insulated composite fabric 420'. The insulated composite fabric 420' of FIG. 15B includes an outer "shell" fabric layer 422 and an inner, insulating fabric layer 421'. As illustrated in FIG. 15B, the insulating fabric layer 421' consists of a double face knit fabric that is bonded to the outer fabric layer 422 with an adhesive 426 to form a fabric laminate. Alternatively or additionally, the insulating fabric layer 421' may be connected to the outer fabric layer by quilting (in any pattern), tucking, ultrasound bonding, etc.

Either or both of the insulating fabric layer 421', and the outer fabric layer 422 can have stretch in at least one direction. The moisture vapor transmission rate and the air permeability of the insulated composite fabric 420' can be controlled as discussed above with regard to FIG. 15A.

Figure 16:
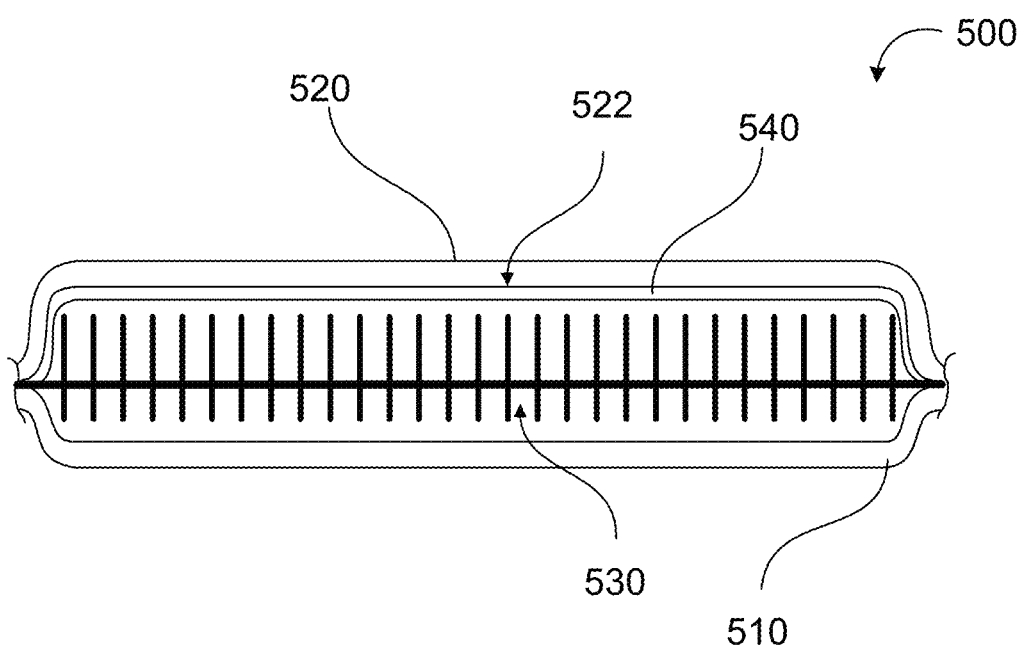
FIG. 16 is an end section view of an insulated composite fabric having a waterproof membrane.

In some cases, the insulated composite fabric may be provided with water resistant properties. For example, the outer "shell" fabric layer may have a very tight construction (e.g., a tight woven construction) and may be treated with durable water repellent (DWR). Alternatively or additionally, the insulated composite fabric may be provided with a waterproof membrane (e.g., a breathable waterproof membrane). For example, FIG. 16 illustrates an embodiment of an insulated composite fabric 500 that consists of an inner "shell-liner" fabric layer 510, and an outer "shell" fabric layer 520 and an insulating-filler fabric layer 530 enclosed therebetween. In this example, a waterproof membrane 540 is laminated to an inner surface 522 of the outer "shell" fabric layer 520. The water barrier can be made of porous hydrophobic membrane, hydrophilic non-porous membrane, or electrospun material. Preferably, the insulating-filler fabric layer 530 is hydrophobic (e.g., formed of hydrophobic yarns/fibers), which, in case of water penetration through the outer fabric layer 520 will not be held or absorbed, and will be able to dry fast.

Figure 17:
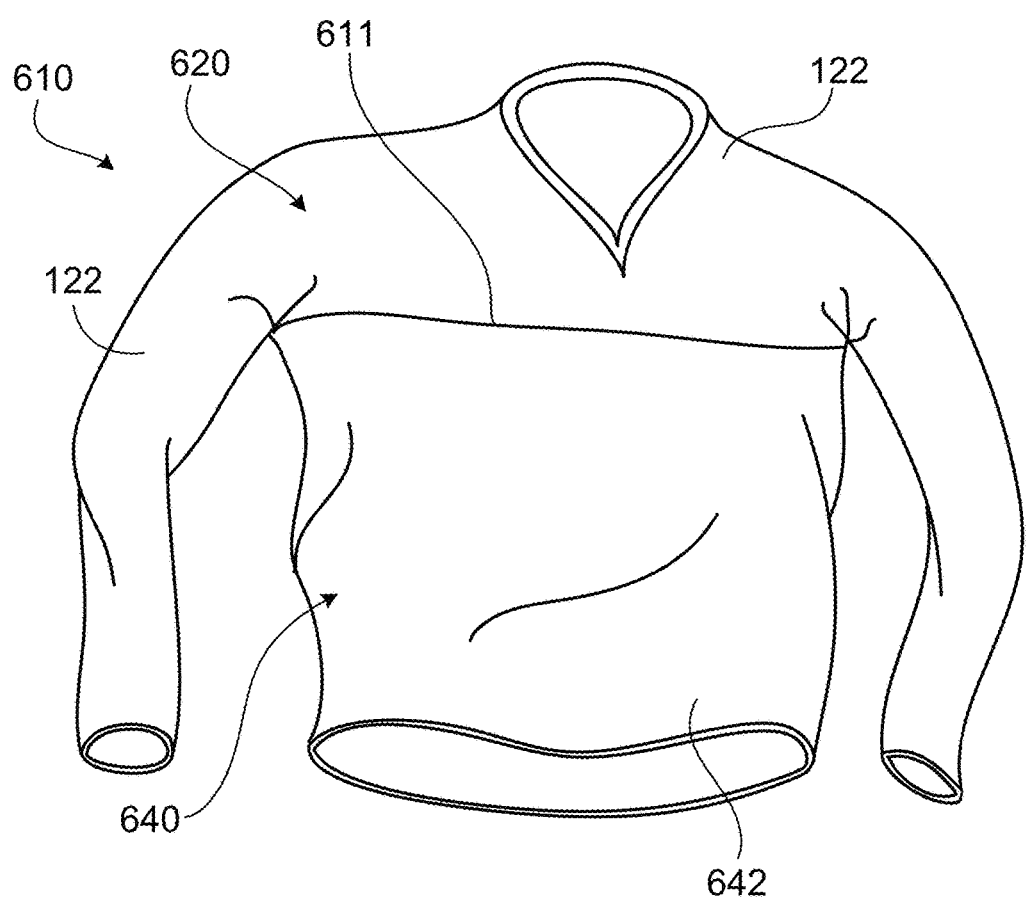
FIG. 17 is a front perspective view of a hybrid insulated fabric garment having regions of contrasting water resistance.

The water proof insulated composite fabric 500 can be used to form an entire fabric garment, or in some cases may only form a portion or portions of the silhouette. For example, FIG. 17 illustrates a hybrid insulated fabric garment 610 that includes a first fabric portion 620 and a second fabric portion 640. The first fabric portion 620 is disposed in one or more upper regions (e.g., arranged to cover a wearer's upper torso, shoulders and extending down the arms) of the fabric garment (i.e., those region more likely in use to be exposed to rain). The first fabric portion 620 is formed of first fabric elements 622. The first fabric elements 622 are formed from a water repellent insulated composite fabric, which may have a construction as described above with regard to FIG. 16.

The second fabric portion 640 is disposed in a lower region (e.g., arranged to cover lower torso and lower back regions of the user's body), which are less likely during use to be exposed to rain. The second fabric portion 640 is formed of second fabric elements 642, which are joined together and with the first fabric elements 622 by stitching at seams 611. The second fabric elements 642 are formed from a second insulated composite fabric, which may have a construction as described above with regard to FIG. 2.

In some implementations, a reversible insulated composite fabric garment may also be provided. For example, the insulated composite fabric garment can be formed of an insulated composite fabric, similar to that described above with reference to FIG. 2, consisting of a first fabric layer, a fabric layer, and an insulating-filler fabric layer enclosed therebetween. The fabric garment may be reversible such that both the first fabric layer and the second fabric layer can optionally serve as either an outer "shell" fabric layer or an inner "shell-liner" fabric layer, which will allow the wearer to have a reversible insulated composite fabric ("technical down") garment. The first and second fabric layers may be made of different color fabrics and/or fabrics with different patterns (e.g., camouflage) and/or different textures.

Although fabric garments in the form of jackets have been described, it should be noted that the insulated composite fabrics described herein may also be incorporated in various types of fabric articles, including, but not limited to, coats, shells, pull-overs, vests, shirts, pants, blankets (e.g., home textile blankets or outdoor blankets), etc.

In some cases, the insulating layer (e.g., the insulating-filler fabric layer (e.g., of any one of FIG. 2, 6-8, 10, 11, or 14A-14C) or the insulating fabric layer (e.g., of any one of FIG. 15A or 15B)) may consist of a terry sinker loop (in reverse plaiting or regular plaiting) in which the terry loop is left un-raised. A high sinker (e.g., 2 to 9 mm) can be used to form the terry sinker loop. In this construction, the terry sinker loop may be provided in a predetermined pattern or design, while having other section(s) without the terry sinker loop (having void), to reduce the total weight as well as helping in the pliability and easy pack ability (easy folding). As mentioned above, the terry sinker loop can be made in regular plaiting construction as well as reverse plaiting. In the case of reverse plaiting, the technical face (jersey side) may be finished, and the technical back may be left in a terry sinker loop (un napped), or the terry sinker loop may be left on the technical back, without napping the technical face-jersey side (similar to regular plaited construction).

In some implementations, the insulating-filler fabric layer 23, e.g., having features discussed above with reference to FIGS. 2-5, contains multi-groove (nano or micro or other) fibers ("MGF"), which is described in more detail below. Referring again to FIGS. 3 and 4, one or both of the raised surfaces 32, 34 or the raised surfaces 42, 44 incorporate the multi-groove fibers. In some implementations, the multi-groove fibers in the raised surfaces have relatively longer whiskers to provide good thermal insulation. Referring again to FIG. 5, backing yarn 54 can form a smooth surface that includes the multi-groove fibers having relatively shorter whiskers. The multi-groove fibers having relatively shorter whiskers can facilitate water management. In some cases, both the fabric bodies and the raised surfaces of the insulating-filler fabric layer 23 incorporate the multi-groove fibers. The multi-groove fibers incorporated in different parts of the layer 23 can have different features, such as denier, whisker lengths, etc.

Multi-groove fibers having relatively shorter whiskers, e.g. as developed by Taiwan Textile Researched Institute ("TTRI"), are described in Liu et al. U.S. Patent Publication No. 2010/0159241, published Jun. 24, 2010 (assigned on its face to Taiwan Textile Research Institute), the complete disclosure of which is incorporated herein by reference. As will be described, whisker fibers permit formation of fabric layers, including raised surface velour and velour/velour fabric layers, with certain advantageous features, including, but not limited to, soft touch or ultra-suede touch, while still generating appropriate thickness/bulk of the raised surface fabric.

Figure 18A:
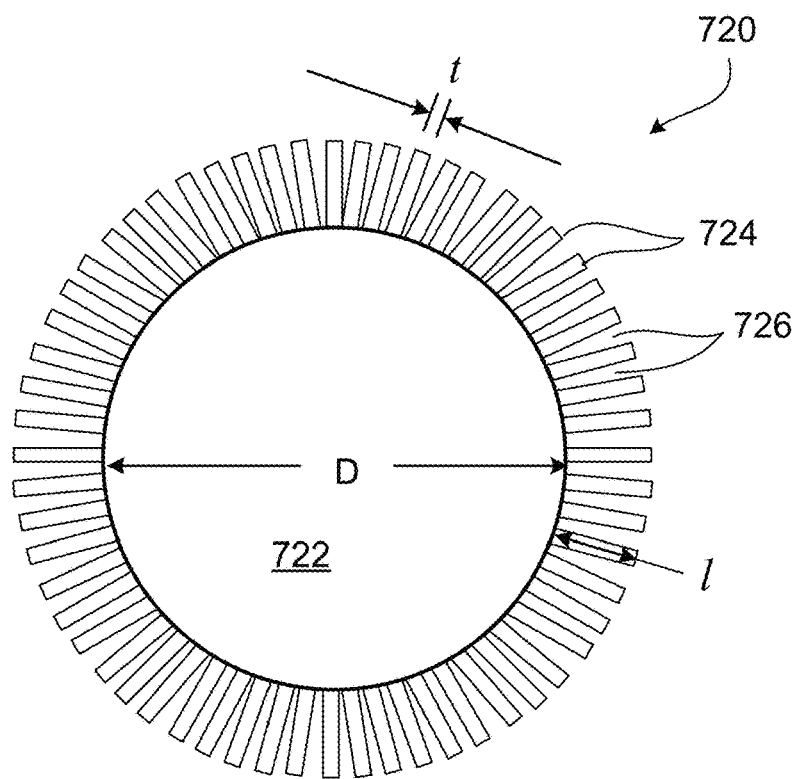
FIGS. 18A and 18B are end section and perspective side views, respectively, of a multi-groove fiber.
Figure 18B:
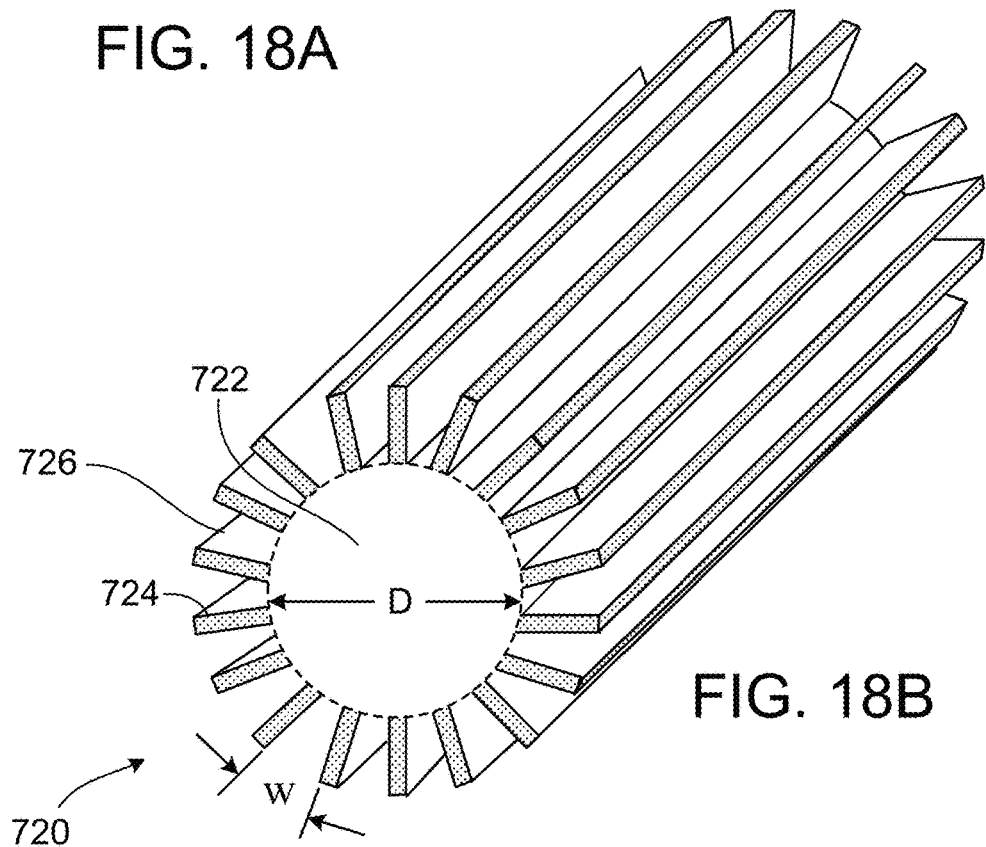
Figure 18C:
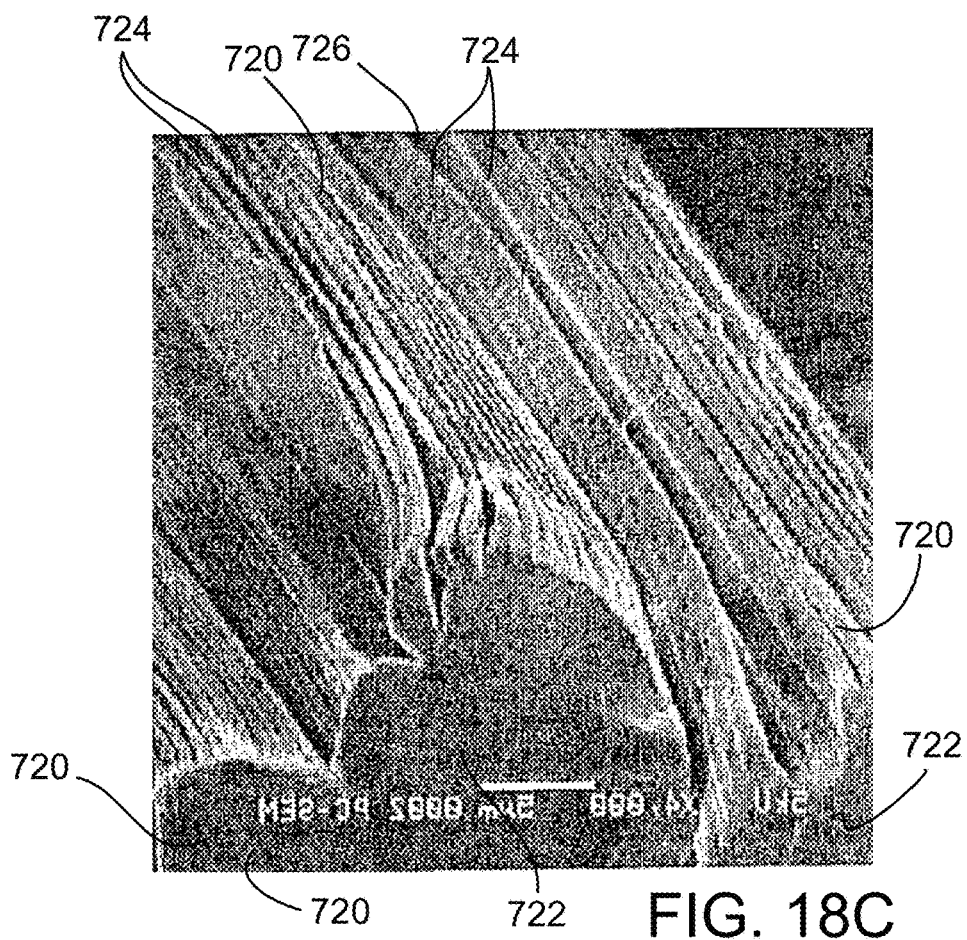
FIG. 18C is an end perspective view of a multi-groove fiber as seen through a scanning electron microscope.

Referring to FIGS. 18A, 18B, and 18C, a multi-groove fiber 720 suitable for use in the insulating-filler fabric layer 23 consists of an axially-elongated core 722 and multiple (e.g., 3-200) grooves 726 defined and spaced apart by whiskers 724 that extend generally radially from the core 722. The whiskers 724, e.g., axially-elongated whiskers, are separated by grooves 726, e.g., axially-elongated grooves, and can have an average radial length, l, in the order of microns or nanometers. The core 722 can have any desired mass density (i.e. denier or mass-per-length), e.g., a coarse denier of about 1.5 dpf to about 10.0 dpf, or a fine denier of about 0.3 dpf to about 1.5 dpf. In some implementations, the total mass density of the fiber 720 is selected to be about 0.3 dpf to about 1.5 dpf. In some implementations, multi-groove fibers 720 are incorporated in the insulating-filler fabric layer 23 have relatively longer whiskers and are relatively coarse to provide good thermal insulation properties.

Figure 18D:
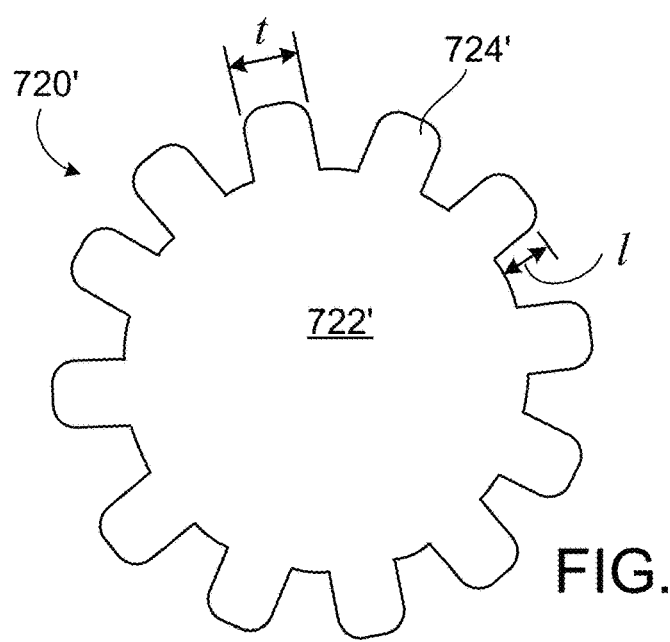
FIGS. 18D and 18E are end section views of other implementations of multi-groove fibers having relative shorter whiskers and having relatively longer whiskers, respectively.
Figure 18E:
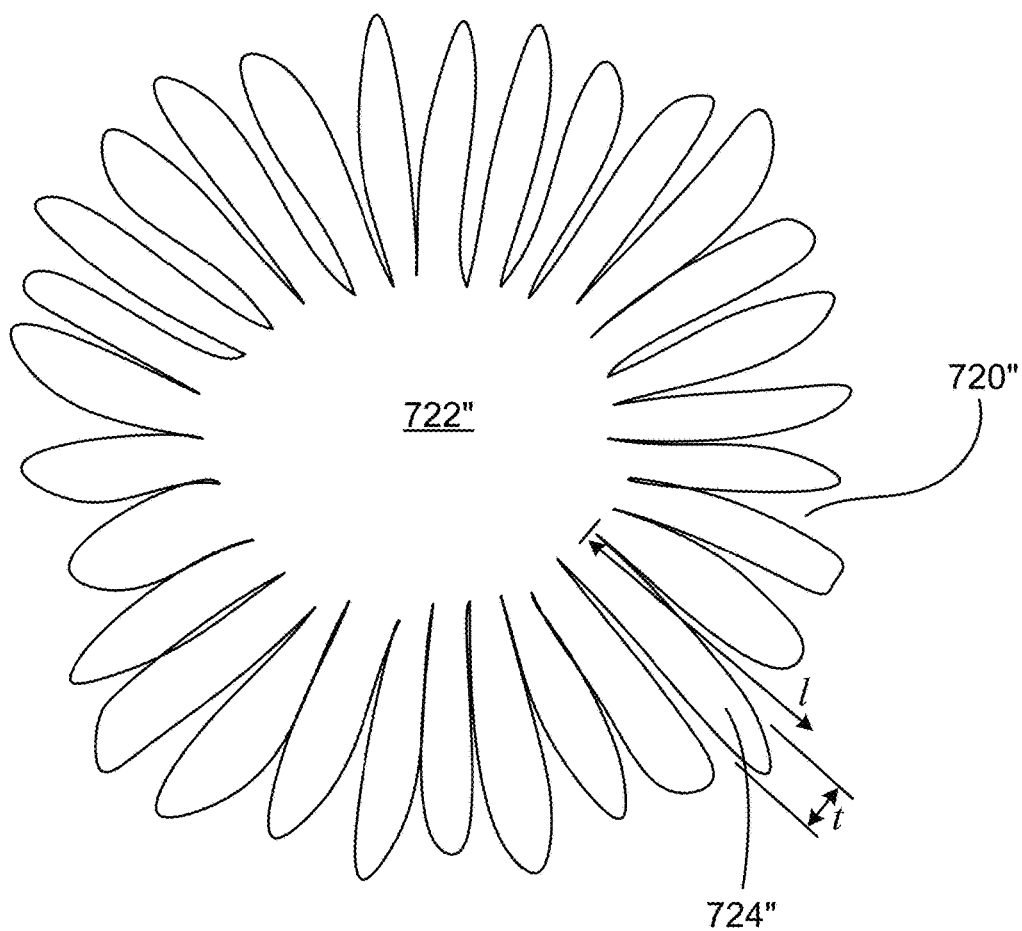

The core 722 is formed of a synthetic (polymeric) material, e.g., selected from among, e.g. polyester, nylon, polypropylene, and others. The whiskers 724 are formed of the same synthetic material as the core 720. For example, both the core 720 and the whiskers 724 are formed of polyester. Referring to FIGS. 18D and 18E, other implementations of multi-groove fibers 720', 720" are shown, e.g. with whiskers of relatively shorter length and relatively longer length, respectively. In some implementations, an average radial length, l, of the whiskers 724' of multi-groove fibers 720' is smaller than the diameter of the core 722'. An average radial length, l, of the whiskers 724" of the multi-groove fibers 720" is greater than the diameter of the core 722". The whiskers may an average length of up to about 200% of the diameter of the core, e.g., for relatively longer whiskers, or may have an average length of down to about 0.01% of a diameter of the core, e.g. for relatively shorter whiskers. The relatively longer whiskers may have an average length in the range of about 20% to about 100% of a diameter of a core, and the relatively shorter whiskers can have an average length in the range of about 0.1% to about 1.0% of a diameter of a core, or about 200 nm to about 2 microns.

The multi-groove fibers can provide the fabric layer with improved thermal insulation properties. The fabric layer can resist release or displacement of the entrapped air as compared to raised surface fabric layers containing conventional fibers, when exposed to dynamic conditions (movement and/or blowing air). Under static conditions, the raised surface or surface regions of the disclosure containing the multi-groove fibers and the raised surface or surface regions containing conventional fibers, without grooves or whiskers, can both entrap a similar amount of air to provide similar thermal insulation properties to the fabric layer. However, air displacement in the raised surface containing the multi-groove fibers is reduced as compared to a raised surface formed of conventional fibers, e.g., because of the tortuosity effect caused by the multi-groove fibers. In addition, under dynamic conditions, i.e., when the fabric layers are in motion, e.g. caused by wind or by movement of the user, movement of multi-groove fibers on a raised surface of the fabric layer of the disclosure is more restricted, e.g. as compared to movement of conventional fibers of a raised surface of a conventional fabric layer, e.g. in particular in the case of relatively longer whiskers. Accordingly, the fabric layer of the disclosure provide good thermal insulation to the user under both static and dynamic conditions.

Figure 19:
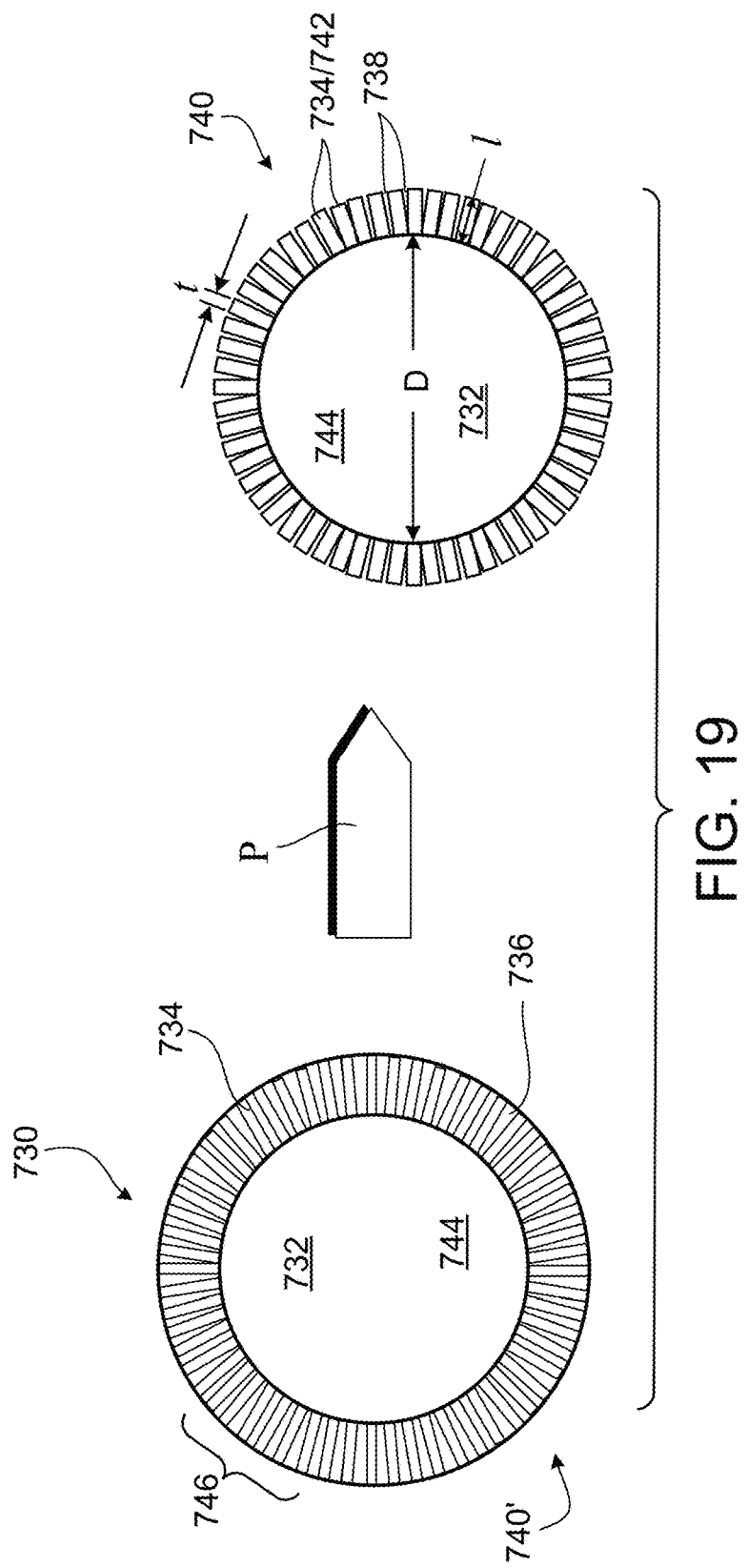
FIG. 19 is a schematic cross-sectional representation of a process for conversion of a precursor into a multi-groove fiber.
Figure 19A:
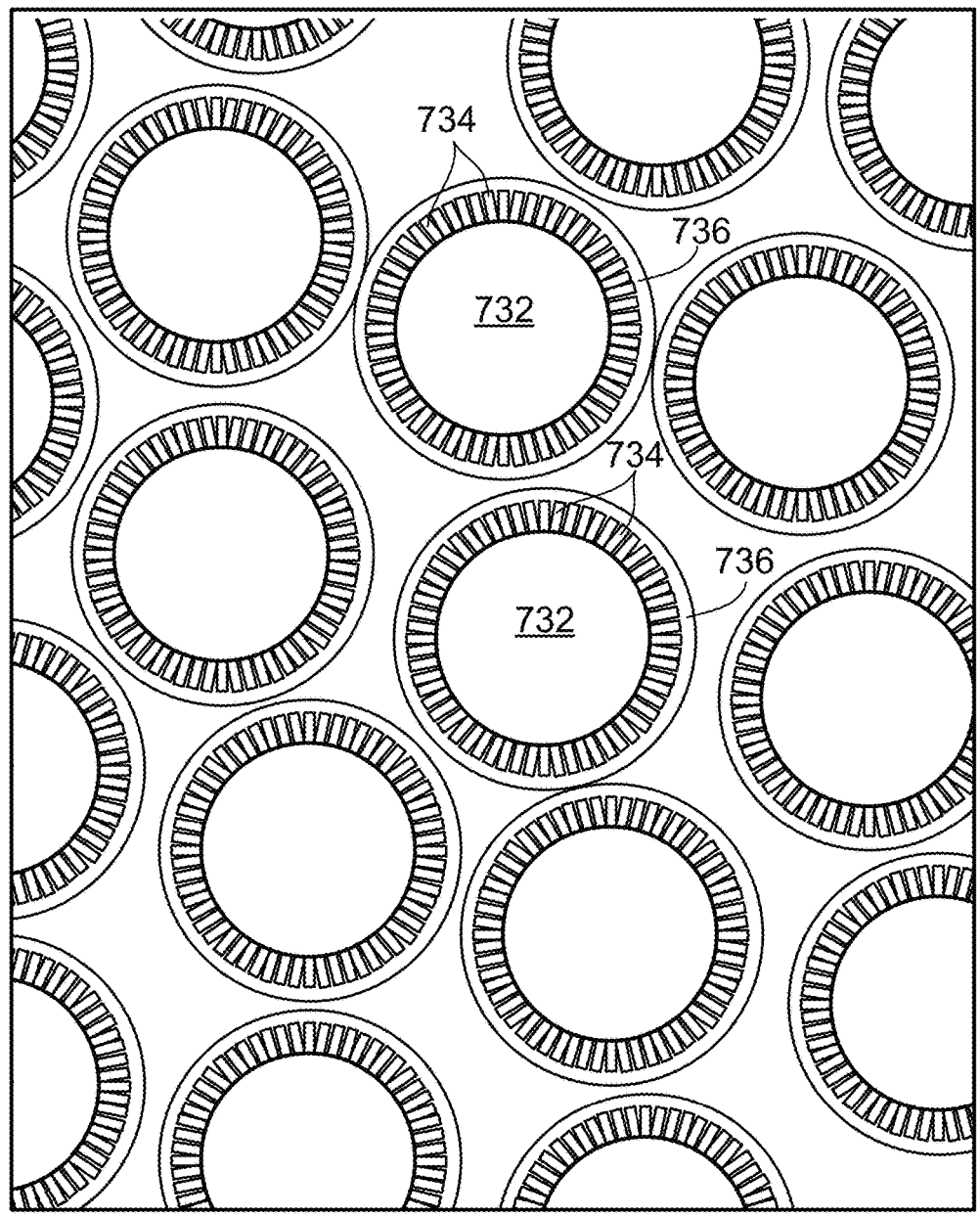
FIG. 19A is an end section view of an intermediate product including a removable sheath during the process of making multi-groove fibers.

Referring also to FIG. 19, the multi-groove fibers may be formed according to processes described in Liu et al. U.S. Patent Publication No. 2010/0159241, as referenced above. Multi-groove fibers may also be available commercially from TTRI. Similar fibers may also be available from Hills, Inc. (Melbourne, Fla. USA). As shown in FIG. 19, according to the patent publication of Liu et al., multi-groove fibers are formed initially as a precursor 740', extruded from a spinneret die, the fiber precursor consisting of a core 732 surrounded by an edge region 746. The edge region 746 is formed of alternating materials 734, 736, e.g., polymeric materials, respectively. The polymer 734 later forms whiskers over the core 732, and the polymer 736 forms a removable, e.g., dissolvable, sheath separating the polymer 734. In some implementations, as shown in FIG. 19A, the sheath 736 extends beyond the whisker material 734 along the radial direction. The surface of the edge region surrounding the core 732 is formed of the sheath material 736. Upon removal of the polymer sheath 736, grooves are formed among the whiskers.

The polymers 734, 736 can be in the form of alternating sheets or webs extending along a longitudinal axis of the core 732. The polymer 734 is the same as the synthetic material forming the core 732. The polymer 736 is different from the materials forming the core 732 and the polymer 734, and is dissolvable or otherwise removable. The polymer 736 and the polymer 734 typically have surface energy that is quite similar. Referring still to FIG. 19, the fiber precursor 740' is next subjected to processing (arrow, P) for removal of the sheath 736, thereby forming multiple grooves 738 disposed about and extending axially along the core 732 of the multi-groove fiber 740, the grooves 738 being defined by and between intervening "whiskers" 742 formed of the sheets of the first set 734.

Referring again to FIGS. 18A and 18B, and also to FIG. 18C, fibers 720 have a core 722 and whiskers 724 separated by grooves 726 extending from the surface of the core. The fibers 720 can be multi-groove nano fibers having a total (including the core and the whiskers) average mass density of about 0.3 dpf to about 10.0 dpf. The fibers 720 can also be multi-groove micro fibers. The whiskers 724 and grooves 726 cause the fibers 720 to have relatively low mass density as compared to a relatively smaller diameter or thickness for fibers in the indicated range of denier. For example, for purposes of comparison, a conventional fiber without the grooves and whiskers and formed of the same material would have a thickness of about 2% to about 75% of the thickness of the fiber 720, in order to have denier in the range indicated for the multi-groove fiber 720. In contrast, if a conventional fiber had a diameter in the range indicated above for multi-groove fiber 720, and was formed of the same material, such a conventional fiber would have denier in the range of about 1.3 to about 50 times the denier of the fiber 720.

According to the present disclosure, the sizes, thicknesses, and/or mass densities of the multi-groove fibers 720 can be selected based on the desired features of the fibers 720, e.g., denier, and/or other features of the raised surface(s) 32, 34, 42, 44, or 52 (FIGS. 3-5). The whiskers 724 can have an average radial length, l, of about 2 nm to about 10 microns, e.g., 200 nm to 2 microns, and an average thickness, t, of about 100 nm to 1 micron, e.g., 200 nm to 1 micron, or 250 nm. As mention above, the grooves can be nano-size or micro-size, e.g., having an average width, w, of about 100 nm to 10 microns, e.g., 250 nm. The ratio of the average diameter, D, of the core 722 to the average length, l, of the whiskers 724 and/or the ratio of the average thickness, t, to the average width, w, can be adjusted to obtain desired fiber properties, e.g., by changing the materials for and/or processes of making the multi-groove fibers 720 (discussed further below). In the example shown in FIG. 3E, the ratio of core diameter to the average length of the whiskers is 1:1.

In some implementations, each multi-groove fiber 720 has about 3 to about 200 whiskers, e.g., about 10-200 whiskers, about 40-200 whiskers, or about 60-80 whiskers, extending generally radially from the core. The grooves 726 extend the entire length of the multi-groove fiber 720. In some implementations, the grooves 726 have substantially the same dimensions and/or are substantially evenly distributed about and/or along a cross-sectional surface of the multi-groove fiber 720. In other implementations, the grooves 726 may have different dimensions and/or may be distributed irregularly. Although the core 722 and the multi-groove fibers 720 appearing in the figures are shown as having circular cross-section, it is to be understood that the core 722 and the multi-groove fibers 720 may have other cross-sectional shapes. In some implementations, a fiber can include both relatively longer whiskers and relatively shorter whiskers along its cross section.

In some implementations, the multi-groove fibers 720 are formed or consist of synthetic (polymeric) material. The core 722 and the whiskers 724 are typically formed of the same polymeric material. Suitable polymeric materials for use in the core 722 and the whiskers 724 include, e.g., polyethylene terephthalate (PET), polypropylene (PP), polyamide 6 (PA 6), PA 66, and/or combinations thereof.

Referring again to FIG. 19, multi-groove fibers 740, e.g., that are similar to or the same as the multi-groove fibers 720 of FIGS. 18A and 18B, can be made by forming a polymer extrusion 730 of three or more polymers 732, 734, 736 and removing one of the polymers 736 to form grooves 738 among whiskers 742 formed of the polymer 736. The polymeric extrusion 30 includes a core region 744 formed of the polymer 732 and an edge region 746 formed of polymers 734, 736. The polymer 734 is the same as the polymer 732, and the whiskers are separated by the sheath formed by the removable polymer 736, e.g., dissolvable polyester, polyvinyl alcohol (PVA), polybutylene terephthalate (PBT), poly (lactic acid) or polylactide (PLA), or others. The sheath can be removed by exposing the polymer extrusion 730 to water or caustic soda (NaOH). The polymer 736 can be removed by heating or radiating the polymer extrusion 730 and dissolving the polymer 736. Other removable polymers and removal mechanisms may also be employed. The polymers 732, 734 can be the previously discussed polymers for forming the core 722 and the whiskers 724.

Referring again to FIGS. 18D and 18E, the thickness, t, and the length, l, of the whiskers 742 can be adjusted by modifying the polymers 734, 736 or other related parameters and factors. For example, the spinneret used for extruding the fibers and/or the weight ratio of the whisker polymer 734 and the sheath polymer 736 can be controlled or adjusted to modify parameters of resulting product. The feeding rate of each polymer, the spin head and the spinning plates in the spinneret can also be modified. For example, the weight ratio can be in the range of from 9/1 to 1/9. The dimensional ratio of the core 744 to the edge 742 (FIG. 19) can also be adjusted, e.g., to provide the desired fiber denier and thickness. In some implementations, multi-groove fibers 720' (FIG. 18D) with relatively shorter and/or thicker edge segments, resulting in relatively shorter and/or thinner whiskers 724', may be desirable, e.g. to produce fabric having a matte appearance or finish. Conversely, multi-groove fiber 720" (FIG. 18E) with relatively longer and/or thinner edge segments, resulting in relatively longer and/or thicker whiskers 724", may also be desirable, e.g. to provide a softer touch to the fibers, and to the fabric containing or made of the fibers, e.g. resembling ultra-suede. The ratio of dissolvable and non-dissolvable segments, as well as the ratio of edge and core dimensions, can also be adjusted.

Figure 20:
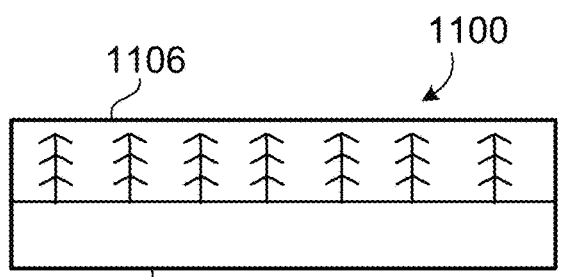
FIG. 20 is a schematic view of a fabric construction of this disclosure implementing incorporation of multi-groove fibers.

In some implementations, the multi-groove fibers can be incorporated in the insulating-filler fabric layer 23 to allow the insulating-filler fabric layer 23 to manage water across the layer. As an example, referring to FIG. 20, a fabric portion 1100 of the insulating-filler fabric layer has a plaited construction can move liquid sweat from the inner side 1104 (facing a user's skin surface) to the outer side 1106. Relatively coarser denier fibers are used on inner side 1104 (facing the user's skin) and relatively finer denier fibers are used on outer side 1106 (away from the user's skin). Use of the multi-groove fibers (or whisker fibers) as the relatively finer denier fiber on the outer side 1106 permits use of very fine fibers on inner side 1104 (0.1 to 1.0 dpf), while still maintaining, or improving, water management. In some implementations, whiskers having a relatively shorter length, l, e.g., 200 nm to 10 microns, can provide good water management by allowing water to move along the grooves 726 (FIG. 18A), 738 (FIG. 19) among the whiskers. The whiskers 724, 742 and the grooves 726, 738 also increase the total surface area of the fibers 720, 740, so that the fibers 720, 740 have a relatively larger capacity to hold liquid and water evaporation can be enhanced. In some implementations, the fibers 720, 740 can have any size core (i.e., any denier) with a desired length of whiskers selected to provide a desired fiber property, e.g., denier and/or water management. In some implementations, the insulating-filler fabric layer is used with the inner and outer layers that also provide water management properties.

Other implementations are within the scope of the following claims.

What is claimed is:

1. A method comprising forming an insulated composite fabric including:
    enclosing an insulating-filler fabric layer between an inner fabric layer and an outer fabric layer, wherein the insulating-filler fabric layer is a textile fabric with at least one raised surface on the fabric; one side of the insulating-filler layer comprising a first surface with relatively high pile, including regions of no pile or relatively low pile interspersed among regions of relatively high pile, the other side of the insulating-filler layer comprising a second surface with relatively high pile, including regions of no pile or relatively low pile interspersed among regions of relatively high pile, wherein the regions of the relatively high pile of the first pile surface and the regions of the relatively high pile of the second pile surface are interconnected with one another; and
    coupling at least one of a fleece and velour that is respectively lower than the relatively high pile of the first surface or the relatively high pile of the second surface to at least one of the first surface and the second surface in one or more of the regions of no pile or relatively low pile.

2. The method of claim 1, wherein enclosing the insulating-filler fabric layer comprises sewing the insulating-filler fabric layer to one or both of the inner fabric layer and the outer fabric layer.

3. The method of claim 1, wherein the at least one of the fleece and velour is coupled to the respective surface by one or more of stitching yarn and backing yarn.

4. The method of claim 1, wherein the insulating-filler layer comprises no pile interspersed among the regions of relatively high pile and relatively low pile interspersed among regions of relatively high pile.

5. The method of claim 1, wherein enclosing the insulating-filler fabric layer comprises laminating the insulating-filler fabric layer to one or both of the inner fabric layer and the outer fabric layer.

6. The method of claim 1, further comprising laminating a waterproof membrane to an inner surface of the outer fabric layer, and so that the waterproof membrane is disposed between the outer fabric layer and the insulating-filler fabric layer, and wherein the waterproof membrane is a vapor permeable membrane, or wherein the waterproof membrane is selected from a porous hydrophobic membrane, a hydrophilic non-porous membrane, and an electrospun membrane.

7. The method of claim 1, wherein the inner fabric layer has an air permeability that is different from an air permeability of the outer fabric layer, and wherein the inner fabric layer has an air permeability that is relatively greater than an air permeability of the outer fabric layer, or wherein the inner fabric layer has an air permeability that is relatively less than an air permeability of the outer fabric layer.

8. The method of claim 1, further comprising stitching the insulating-filler fabric layer to one or both of the inner fabric layer and the outer fabric layer along a periphery of the insulated composite fabric.

* * * * *